US012626254B2

(12) United States Patent
Boyraz et al.

(10) Patent No.: US 12,626,254 B2
(45) Date of Patent: May 12, 2026

(54) ENCRYPTED TRANSFERS IN A DISTRIBUTED LEDGER

(71) Applicant: Ava Labs, Inc., New York, NY (US)

(72) Inventors: Furkan Boyraz, Cengelkoy (TR);
Emre Kaan Satiş, Şişli (TR); Mehmet Berat Öztürk, Şişli (TR)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 18/966,562

(22) Filed: Dec. 3, 2024

(65) Prior Publication Data

US 2025/0182109 A1    Jun. 5, 2025

Related U.S. Application Data

(60) Provisional application No. 63/606,301, filed on Dec. 5, 2023.

(51) Int. Cl.
*G06Q 20/40* (2012.01)
*H04L 9/30* (2006.01)
*H04L 9/32* (2006.01)

(52) U.S. Cl.
CPC ......... *G06Q 20/401* (2013.01); *H04L 9/3066* (2013.01); *H04L 9/3221* (2013.01)

(58) Field of Classification Search
CPC .... G06Q 20/401; H04L 9/3066; H04L 9/3221
See application file for complete search history.

(56) References Cited

U.S. PATENT DOCUMENTS

| | | | | |
|---|---|---|---|---|
| 6,778,666 B1 * | 8/2004 | Kuzmich | .............. | H04L 9/3066 |
| | | | | 708/492 |
| 10,764,029 B1 * | 9/2020 | Atkins | .................. | H04L 9/3066 |

(Continued)

FOREIGN PATENT DOCUMENTS

| | | |
|---|---|---|
| CN | 112819465 A | 5/2021 |
| GB | 2623304 A | 4/2024 |

(Continued)

OTHER PUBLICATIONS

International Search Report and Written Opinion for International Patent App. No. PCT/US2024/058298, mailed Jan. 30, 2025 (16 pages).

(Continued)

*Primary Examiner* — Gregory Harper
(74) *Attorney, Agent, or Firm* — McDermott Will & Schulte LLP

(57) ABSTRACT

Various aspects of the subject technology relate to systems, methods, and machine-readable media for improving the privacy of transfers in a distributed ledger. Various aspects may include encrypting a transaction using a first public key corresponding to a first user and a second public key corresponding to a second user. Aspects may also include transmitting the encrypted transaction to a blockchain, the encrypted transaction including at least an encrypted amount, a zero-knowledge proof, and an encrypted balance of the first user. Aspects may also include verifying a correctness of the zero-knowledge proof. Aspects may also include, based on the correctness, executing the transaction through a smart contract of the blockchain and homomorphically updating encrypted balances of the first user and the second user in accordance with the encrypted amount.

17 Claims, 12 Drawing Sheets

(56) References Cited

U.S. PATENT DOCUMENTS

| | | | |
|---|---|---|---|
| 10,970,717 B2 | 4/2021 | Menon | |
| 11,151,558 B2 | 10/2021 | Ferenczi | |
| 11,232,439 B2 | 1/2022 | Westland | |
| 11,449,819 B2 | 9/2022 | Heath | |
| 11,496,327 B1 * | 11/2022 | Kaplan | G06Q 20/381 |
| 11,720,891 B2 | 8/2023 | Madisetti | |
| 11,968,304 B2 * | 4/2024 | Wright | H04L 9/3252 |
| 12,099,997 B1 * | 9/2024 | Hoffberg | G06Q 20/065 |
| 12,259,996 B2 * | 3/2025 | Chiu | H04L 9/0825 |
| 2012/0036368 A1 * | 2/2012 | Spalka | H04L 9/0866 |
| | | | 713/182 |
| 2012/0087494 A1 * | 4/2012 | Spalka | H04L 9/3066 |
| | | | 380/46 |
| 2017/0046698 A1 | 2/2017 | Haldenby et al. | |
| 2017/0155515 A1 * | 6/2017 | Androulaki | H04L 9/006 |
| 2018/0191503 A1 * | 7/2018 | Alwar | H04L 9/3242 |
| 2019/0020480 A1 * | 1/2019 | Camenisch | H04L 9/3263 |
| 2019/0164153 A1 * | 5/2019 | Agrawal | G06Q 20/065 |
| 2019/0228386 A1 | 7/2019 | Onnainty | |
| 2019/0251553 A1 * | 8/2019 | Ma | H04L 9/3239 |
| 2019/0251554 A1 * | 8/2019 | Ma | H04L 9/0869 |
| 2019/0251558 A1 * | 8/2019 | Liu | G06Q 20/389 |
| 2020/0074459 A1 | 3/2020 | Ma et al. | |
| 2020/0074552 A1 * | 3/2020 | Shier | G06Q 20/10 |
| 2020/0153627 A1 | 5/2020 | Wentz | |
| 2020/0193425 A1 | 6/2020 | Ferenczi et al. | |
| 2020/0195419 A1 | 6/2020 | Zhang et al. | |
| 2020/0311257 A1 | 10/2020 | Wei et al. | |
| 2020/0313856 A1 * | 10/2020 | Basu | H04L 9/3073 |
| 2021/0067321 A1 | 3/2021 | Lu | |
| 2021/0150524 A1 * | 5/2021 | Yan | G06F 21/64 |
| 2021/0157788 A1 | 5/2021 | Du | |
| 2021/0217001 A1 | 7/2021 | Harrison | |
| 2021/0281413 A1 | 9/2021 | Ma et al. | |
| 2021/0297262 A1 * | 9/2021 | Fang | G06Q 50/26 |
| 2021/0297418 A1 * | 9/2021 | Fang | H04L 63/0407 |
| 2021/0303713 A1 * | 9/2021 | Sreedhar | H04L 9/3247 |
| 2021/0349770 A1 * | 11/2021 | Fang | G06F 21/645 |
| 2021/0350368 A1 * | 11/2021 | Young | G06Q 20/401 |
| 2021/0374184 A1 | 12/2021 | O'Brien | |
| 2021/0382620 A1 * | 12/2021 | Fang | G06Q 10/10 |
| 2021/0382831 A1 * | 12/2021 | Sun | G06F 16/2315 |
| 2022/0020018 A1 * | 1/2022 | Jivanyan | H04L 9/3073 |
| 2022/0092587 A1 * | 3/2022 | Jevans | G06Q 20/405 |
| 2022/0108310 A1 | 4/2022 | Westland | |
| 2022/0138707 A1 | 5/2022 | Makrides | |
| 2022/0141021 A1 | 5/2022 | Makrides | |
| 2022/0164338 A1 | 5/2022 | Blackshear et al. | |
| 2022/0255743 A1 * | 8/2022 | Vágujhelyi | H04L 9/3239 |
| 2022/0263664 A1 | 8/2022 | Wahab et al. | |
| 2022/0278845 A1 | 9/2022 | Manevich | |
| 2022/0321360 A1 * | 10/2022 | Wahab | H04L 9/3252 |
| 2022/0391831 A1 | 12/2022 | Heath et al. | |
| 2023/0028324 A1 * | 1/2023 | Kikinis | G06Q 20/381 |
| 2023/0186296 A1 | 6/2023 | Vines et al. | |
| 2023/0208638 A1 | 6/2023 | Manevich | |
| 2023/0208640 A1 * | 6/2023 | El Khiyaoui | H04L 9/3247 |
| | | | 713/168 |
| 2023/0260037 A1 | 8/2023 | Mussallem et al. | |
| 2023/0318833 A1 * | 10/2023 | Haber | G06Q 40/06 |
| | | | 713/168 |
| 2023/0385265 A1 | 11/2023 | Karamanolis et al. | |

| | | | |
|---|---|---|---|
| 2024/0007267 A1 * | 1/2024 | Kumar | H04L 9/0656 |
| 2024/0039715 A1 * | 2/2024 | McCarty | H04L 9/0861 |
| 2024/0160969 A1 * | 5/2024 | Richter | G06N 20/00 |
| 2024/0163075 A1 * | 5/2024 | Ku | H04L 9/0618 |
| 2024/0171014 A1 * | 5/2024 | Rakshit | H02J 50/80 |
| 2024/0185191 A1 * | 6/2024 | Bernardi | H04L 9/50 |
| 2024/0187264 A1 * | 6/2024 | Wu | H04L 9/50 |
| 2024/0214194 A1 * | 6/2024 | Kapur | H04L 9/088 |
| 2024/0283649 A1 * | 8/2024 | Richter | H04L 9/3297 |
| 2024/0386425 A1 * | 11/2024 | De Caro | G06Q 20/02 |
| 2024/0422011 A1 * | 12/2024 | Sekniqi | G06F 21/64 |
| 2025/0069074 A1 | 2/2025 | Narumanchi | |

FOREIGN PATENT DOCUMENTS

| | | | | |
|---|---|---|---|---|
| WO | 2020110025 A1 | 6/2020 | | |
| WO | WO-2020142526 A1 * | 7/2020 | | G06F 16/2255 |
| WO | 2021009528 A1 | 1/2021 | | |
| WO | 2024236572 A1 | 11/2024 | | |

OTHER PUBLICATIONS

International Search Report and Written Opinion for International Patent App. No. PCT/US2024/058300, mailed Feb. 3, 2025 (17 pages).

Jeong, G., et al, Azeroth: Auditable Zero-Knowledge Transactions in Smart Contracts, IEEE Access, vol. 11, 2023, Jun. 12, 2023, pp. 56463-56480 (Year: 2023).

Drake, "Accumulators, scalability of UTXO blockchains, and data availability", retrieved from https://ethresear.ch/t/accumulators-scalability-of-utxo-blockchains-and-data-availability/176, Oct. 2017, 12 pages (Year: 2017).

Guan et al. "BlockMaze: An Efficient Privacy Preserving Account-Model Blockchain Based on zk-SNARKs", IEEE Transactions on Dependable and Secure Computing, vol. 19, No. 3, May/Jun. 2022, pp. 1446-1463 (Year: 2022).

Sheldon, "ACID (atomicity, consistency, isolation, and durability)", retrieved from https://www.techtarget.com/searchdatamanagement/definition/ACID on Feb. 4, 2024, 7 pages (Year: 2024).

Su et al., "Building Blocks for Atomicity in Electronic Commerce", Sixth Usenix Security Symposium Jul. 22-25, 1996, Department of Computer Science, Carnegie Mellon University, 9 pages (Year: 1996).

Tao et al., On Atomicity and Confidentiality Across Blockchains Under Failures, IEEE Transactions on Knowledge and Data Engineering, vol. 36, No. 2, Feb. 2024, 15 pages (Year: 2024).

Watts, "ACID Explained: Atomic, Consistent, Isolated & Durable—BMC Software | Biogs", retrieved from https://www.bmc.com/blogs/acid-atomic-consistent-isolated-durable/, Apr. 24, 2020, 30 pages (Year: 2020).

USPTO—Office Action mailed on Dec. 12, 2025 for corresponding U.S. Appl. No. 19/316,572, 20 pages.

USPTO, Office Action mailed Feb. 24, 2026 for related U.S. Appl. No. 19/356,430 (22 pages).

Alonso, K.M., et al.; Zero to Moreno: First Edition: A Technical Guide to a Private Digital Currency for Beginners, Amateurs, and Experts. Jun. 26, 2018, 91 pages, (v1.0.0) public.

* cited by examiner

100

PARTICIPANTS 110

PARTICIPANTS 130

150
NETWORK

152
DATABASE

FIG. 1

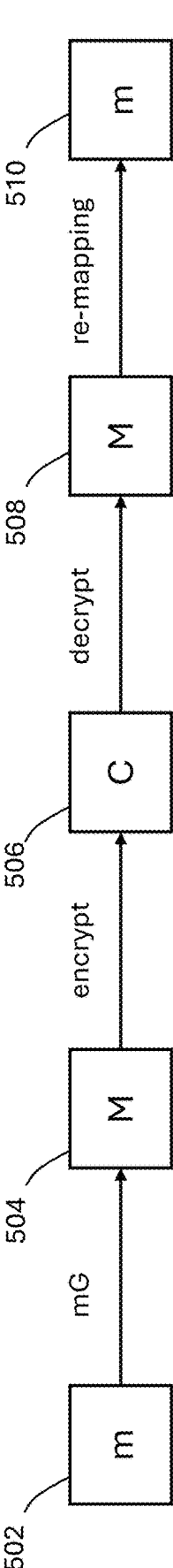
FIG. 5

900

902 — Encrypting a transaction using a first public key corresponding to a first user and a second public key corresponding to second user 904 — Generating a zero-knowledge proof 906 — Generating a transaction summary 908 — Transmitting the encrypted transaction to a blockchain 910 — Verifying a correctness of the zero-knowledge proof 912 — Based on the correctness, executing the transaction through a smart contract of the blockchain

FIG. 9

ENCRYPTED TRANSFERS IN A DISTRIBUTED LEDGER

CROSS-REFERENCE TO RELATED APPLICATIONS

The present disclosure is related and claims priority under 35 U.S.C. § 119(e), to U.S. Provisional Patent Application No. 63/606,301, entitled METHOD, SYSTEMS, AND PROTOCOLS FOR ENCRYPTED STORAGE AND TRANSFERS OF USER BALANCES AND AUDITABLE PRIVATE ASSET TRANSFER FRAMEWORK IN A DISTRIBUTED LEDGER, to Furkan Boyraz et al., filed on Dec. 5, 2023, the contents of which are hereby incorporated by reference in their entirety, for all purposes.

TECHNICAL FIELD

The present disclosure generally relates to a confidentiality-preserving token (CPT) protocol which provides confidentiality for transactions in a distributed ledger and confidential transfers of balances between users. The CPT protocol leverages zero-knowledge proofs and additively homomorphic encryption to enable confidential transfers of balances between users and keep account states hidden from third parties. The CPT protocol further provides auditability for transactions to auditors while protecting the information from non-auditors.

BACKGROUND

Blockchain technology has surged in popularity for creating distributed applications that foster trustlessness and transparency. This decentralized approach ensures that no single entity has control, thereby enhancing security and reliability. However, integrating substantial privacy measures into these platforms remains a complex challenge. Despite numerous propositions aimed at providing privacy within blockchain ecosystems in recent years, widespread adoption has been hindered due to limitations in versatility, user experience complications, or impractical implementation.

With the widespread adoption of blockchains, various decentralized applications (dApps) and digital assets used in dApps are becoming increasingly popular. These applications leverage the inherent benefits of blockchain technology, such as immutability and transparency, to offer innovative services and solutions. However, unlike traditional banking systems, the blockchain creates privacy concerns about digital assets since all transaction information is shared across the network to ensure strong data integrity. This transparency, while beneficial for security, poses privacy risks for users and their transactions.

Addressing these privacy concerns is crucial for the continued growth and acceptance of blockchain technology in various sectors. Therefore, there is a pressing need for solutions that can provide robust privacy measures without compromising the core principles of blockchain technology.

BRIEF SUMMARY

The subject disclosure provides for systems and methods for enhancing security and privacy of transactions through a confidentiality-preserving token (CPT) protocol that leverages zk-proofs and ECEG encryption to provide on-chain confidentiality for transactions.

According to embodiments, a computer-implemented method for implementing secure transfers in a distributed ledger is provided. The method includes encrypting a transaction using a first public key corresponding to a first user and a second public key corresponding to a second user. The method also includes transmitting the encrypted transaction to a blockchain, the encrypted transaction including at least an encrypted amount, a zero-knowledge proof, and an encrypted balance of the first user. The method also includes verifying a correctness of the zero-knowledge proof. The method also includes, based on the correctness, executing the transaction through a smart contract of the blockchain and homomorphically updating encrypted balances of the first user and the second user in accordance with the encrypted amount.

According to embodiments, a system is provided including a processor and a memory comprising instructions stored thereon, which when executed by the processor, cause the processor to perform operations to improve security of transfers in a distributed ledger. The operations include encrypting a transaction using a first public key corresponding to a first user and a second public key corresponding to a second user. The operations also include transmitting the encrypted transaction to a blockchain, the encrypted transaction including at least an encrypted amount, a zero-knowledge proof, and an encrypted balance of the first user. The operations also include verifying a correctness of the zero-knowledge proof. The operations also include, based on the correctness, executing the transaction through a smart contract of the blockchain and homomorphically updating encrypted balances of the first user and the second user in accordance with the encrypted amount.

According to embodiments, a non-transitory computer-readable medium storing a program for implementing secure transfers in a distributed ledger is provided. The program, which when executed by a computer, configures the computer to encrypt a transaction using a first public key corresponding to a first user and a second public key corresponding to a second user. The program, when executed by a computer, further configures the computer to transmit the encrypted transaction to a blockchain, the encrypted transaction including at least an encrypted amount, a zero-knowledge proof, and an encrypted balance of the first user. The program, when executed by a computer, further configures the computer to verify a correctness of the zero-knowledge proof. The program, when executed by a computer, further configures the computer to, based on the correctness, execute the transaction through a smart contract of the blockchain and homomorphically update encrypted balances of the first user and the second user in accordance with the encrypted amount.

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 1 is a block diagram of a device operating environment with which aspects of the present disclosure can be implemented.

FIG. 5 is a block diagram illustrating an Elliptic Curve ElGamal (ECEG) encryption scheme implemented in encrypted CPT protocols, according to certain aspects of the present disclosure.

FIG. 9 illustrates an example flow diagram for implementing secure transactions in a distributed ledger, according to certain aspects of the present disclosure.

Figure 2:
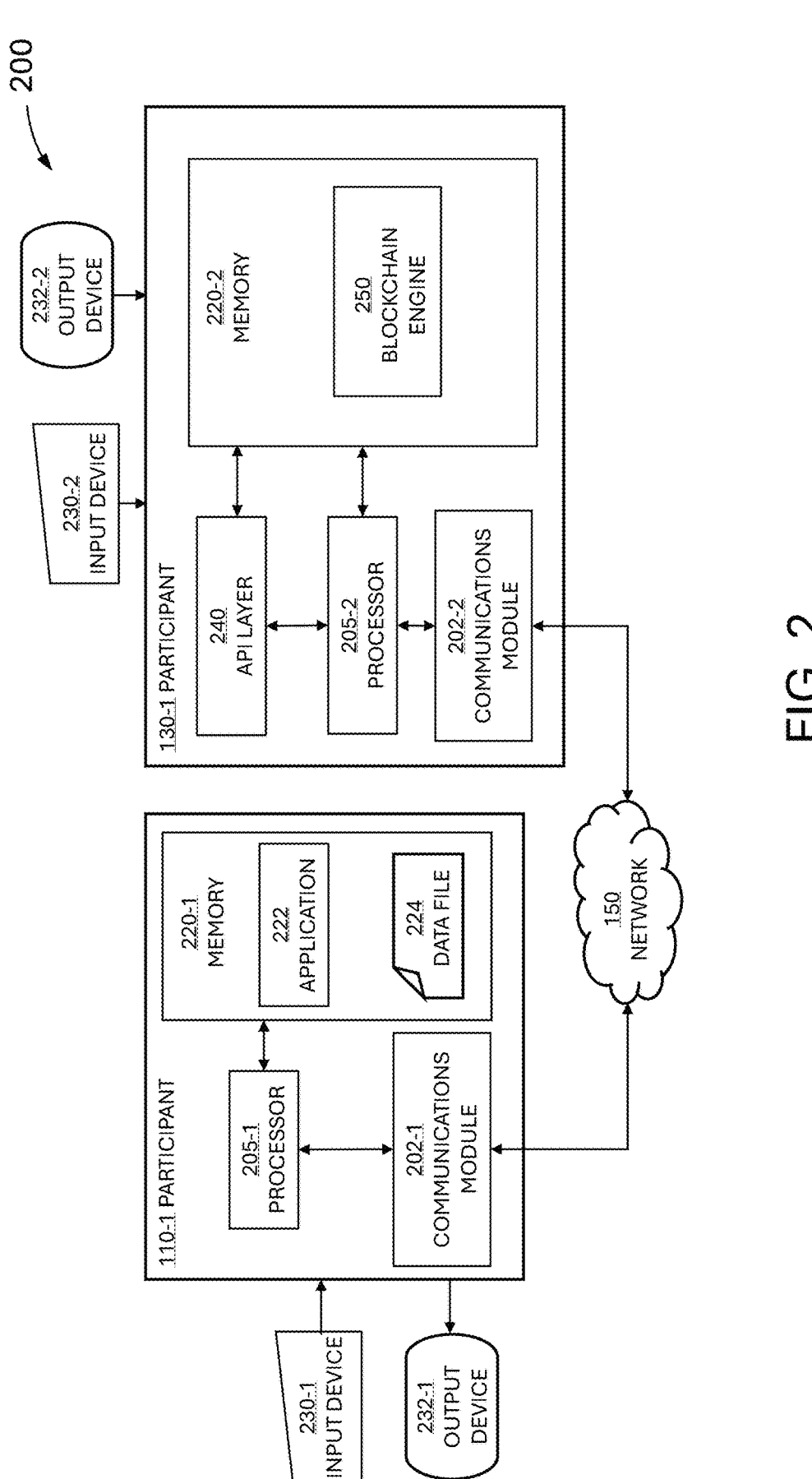
FIG. 2 is a block diagram illustrating details of devices used in the architecture of FIG. 1, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

Blockchain technology has surged in popularity for creating distributed applications that foster trustlessness and transparency. However, integrating substantial privacy measures into these platforms remains a complex challenge. Despite numerous propositions aimed at providing privacy within blockchain ecosystems in recent years, widespread adoption has been hindered due to limitations in versatility, user experience complications, or impractical implementation. The current solutions face issues like limited value range support, complex nonce systems, and extensive lookup tables. These limitations make them impractical for real-world applications, particularly for devices with limited computational resources. The need for a practical and efficient solution that supports large value ranges and maintains user-friendly operations is critical for the widespread adoption of blockchain-based confidential payment systems.

For example, permissioned blockchains may be used to link user accounts with associated institutions (e.g., banks). These institutions maintain private ledgers that record public keys and corresponding balances of user accounts. To facilitate additive homomorphism in its balances, which are stored as exponents, the permissioned blockchains may employ a variant of ElGamal encryption. However, the implementation utilizes Shanks' algorithm to handle a limited range of values, capping at $2^{32}$. This limitation poses a significant constraint for many financial applications, notably in tokenization, which generally requires the capacity to represent values between $2^{40}$ and $2^{64}$, especially for decimal value representation.

As another example, decentralized blockchain platforms offer a confidential transaction mechanism on a blockchain (e.g., Ethereum) by allowing the blockchain's native coins to be transformed into ERC-20 tokens within a smart contract. These tokens are encrypted using an additively homomorphic ElGamal scheme and are verified by range proofs to ensure their validity. However, these frameworks are similarly limited in their range of values, supporting values only up to $2^{32}$, and face additional challenges due to its custom nonce system and a rollover function, which collectively contributes to a less practical system for users.

As another example, confidential and distributed payment systems may leverage a variant of ElGamal encryption. For example, the variant may include an additional generator h in its public parameters used to verify relationships between ciphertexts encrypted using three distinct public keys. Although the system acknowledges the superior efficiency of heuristic methods like the kangaroo algorithm, it chooses Shanks' algorithm due to its straightforward time-space tradeoff and the case of parallelization. Therefore, these systems support up to $2^{32}$ values and use a 264 MB lookup table, which is still quite extensive and limits its suitability for devices with limited storage. While values within the range of 1 to $2^{32}$ can be extracted using these techniques, they are often computationally intensive or require substantial memory resources for lookup tables, while still being very limited, making them impractical for larger scalars.

Zero-knowledge proof (ZKP) systems may be used in blockchains to resolve the conflict between privacy and verifiability. The ZKP is a proof system that can prove the validity of the statement without revealing the witness value; users can prove arbitrary statements of encrypted data, enabling public validation while protecting data privacy. As asset transactions on the blockchain increase, the demand for adequate auditing capabilities is also increasing. Moreover, if transaction privacy is protected without proper regulation, financial transactions can be abused by criminals and terrorists. Without the management of illegal money flows, it would also be difficult to establish a monetary system required to maintain a sound financial system and enforce policies accordingly.

Embodiments, as disclosed herein, provide a solution to the above-mentioned problems rooted in computer technology, namely, a confidentiality-preserving token (CPT) protocol for enhancing security and privacy in blockchain transactions. According to some embodiments, the protocol may be initiated as a smart contract on a blockchain. According to embodiments, the CPT protocol leverages zk-morphic proofs and ECEG encryption over the Baby-JubJub curve to provide on-chain confidentiality for financial transactions. This protocol includes user registration, deposit, transfer, withdrawal, Chinese Remainder Theorem (CRT)-based decryption, Dynamic Balance Arrangement (DBA), and auditability features. These features collectively address the critical issues of versatility, user experience, and practical implementation, making the CPT protocol a more viable and secure solution for confidential payment systems on blockchain platforms. The CPT protocol may be used as part of a fully decentralized, confidential, and auditable payment system, blockchain platforms including, but not limited to, customized blockchains, permission blockchains and/or subnets, or the like. The CPT protocol is designed to be compatible with Virtual Machines (VMs) and other smart contract platforms that may employ an account-based model to balance efficiency and user-friendliness.

According to embodiments, amounts in transfers are encrypted as well as the user balances stored in the blockchain storage, ensuring confidential transfers. In this manner, the CPT protocol may be a smart contract that confidentially maintains account balances, using a user's key, and provides encrypted methods for depositing, transferring, and withdrawing funds, all verifiable through cryptographic proofs.

According to embodiments, the zk-proofs offer an efficient means of verifying assertions about values encrypted homomorphically within zero-knowledge proof systems (e.g., Zero-Knowledge Succinct Non-Interactive Argument of Knowledge (zk-SNARK) circuits). Elliptic Curve ElGamal Encryption (ECEG) is utilized to enable efficient homomorphic operations. ECEG is also utilized in the CPT protocol for its compatibility and efficiency with zk-SNARK prime fields, as well as its computational speed, which is crucial for blockchain transaction mechanisms. The additive homomorphic property of ECEG encryption is advantageously preserved while concurrently addressing and mitigating specific challenges occurring in the implementation in context of enabling confidential blockchain transactions. By employing zk-proofs and ECEG encryption, the CPT protocol ensures that transactions remain confidential while maintaining the integrity and validity of the blockchain network. This approach supports large value ranges efficiently, overcoming the limitations of existing systems that struggle with extensive lookup tables and complex nonce systems.

According to embodiments, the CPT protocol ensures encrypted values are suitable for decryption and scalar recovery using a sub-value method. Sensitive values are broken into smaller sub-values by dividing them by predetermined prime numbers, resulting in congruences that are mapped to elliptic curve points and encrypted. As such, in the CPT smart contract, user balances and transaction amounts are stored, e.g., on the blockchain, as sets of congruences. This method maintains computational efficiency and supports financial applications by preserving the homomorphic properties of ECEG.

According to embodiments, the zk-proofs in CPT may be generated with respect to a certain state of the contract. However, zk-proofs for a confidential transfer needs to show that the remaining balance after deducting the amount of the transfer is positive. Front running issues may arise when other transactions are introduced during proof generation. For example, a user Alice may generate a zk-proof for a transaction according to her current account balance. The current account balance may be stored in an encrypted form on the CPT smart contract. In the event that another user Bob transfers some encrypted tokens to Alice, and Bob's transaction gets processed first, then Alice's encrypted balance which she prepared the zk-proof according to will change and the corresponding transaction will be rejected because the proof will not be valid anymore. That is, the proof was generated based on a balance that is no longer correct, causing the verification to fail due to a front-running problem. Note that Bob may be a totally benign user, yet Alice loses the fees she paid to process the transaction. Burn transactions have a similar problem too: a proof that a ciphertext encrypts a certain value becomes invalid if the ciphertext changes. Some applications propose rolling over methods to fix this issue. However, these methods add a layer of complexity and result in bad user experience due to increased and volatile gas cost faced by the sender of the transaction, rendering it unusable in real-world scenarios. According to embodiments, the DBA mechanism effectively prevents front-running attacks by maintaining a list of past user balances until the owner of the balance conducts an operation that causes a decrease in the balance, thereby enhancing security and trust in the system. This approach safeguards CPT from front-running attacks and overcomes the constraints of previous privacy solutions, thus enabling widespread applications such as payments, Confidential Foreign Exchange (FX) swaps, interchain bridges, and proof-of-stake with enhanced confidentiality.

According to embodiments, CPT may facilitate confidential payments within the protocol that provides auditability for auditors while protecting transaction information from non-auditors. Symmetric encryption is used to enforce privacy and integrity of the confidential transactions while providing auditor accountability to the regulatory institution. According to some embodiments, a Poseidon symmetric encryption scheme, which is based on the Elliptic Curve Diffie-Hellman (ECDH) key agreement, may be used for generating transaction summaries to ensure auditability compliance with regulatory requirements. In some embodiments, the auditor may decrypt the transaction summaries using an auditory key. This approach is specifically advantageous in the CPT setting due to its compatibility with zero-knowledge proof constructions, particularly in zk-SNARKs, where the Poseidon hash function is already a standard choice for hashing due to its efficiency and security properties. As such, CPT provides a robust framework for preventing illicit activities while maintaining user privacy. The disclosed subject technology provides improvements to the technological field through its efficiency and applicability. The practicality of the CPT protocol has been substantiated through its implementation, accompanied by empirical evaluations that measure the efficiency of proof generation on devices with limited computational resources, such as smartphones, as well as the contract's gas expenditure on the blockchain. According to embodiments, CPT may use an 8 MB size lookup table, which are not only more accommodating for devices with limited storage, such as mobile phones, but also extend support to $2^{55}$ values and can be adjusted to handle up to $2^{254}$. By non-limiting example, the construction of a zk-morphic proof designed for a CPT transaction has been demonstrated to require less than 0.54 seconds on an iPhone 13, exemplifying the protocol's efficiency and practical applicability in real-world scenarios.

Encrypting transactional data and enabling homomorphic operations can be applied across various scenarios, showcasing the protocol's adaptability and potential to transform secure digital transactions in multiple domains. The applications discussed demonstrate the effectiveness and versatility of the CPT protocol in enhancing privacy and integrity in digital transactions. For example, the protocol may be applied in blockchain transactions or adopted by other platforms and/or services that accept cryptocurrencies as payment methods to ensure that payment processes remain confidential, a feature particularly beneficial for both in-store and cross-border payments. By non-limiting example, another practical application of the protocol includes financial institutions operating on their own permissioned chains (e.g., the FX swap), particularly relevant for financial institutions operating on their own permissioned chains. By non-limiting example, the protocol may be used for enabling confidential interchain bridges which is vital in institutional scenarios where cross-chain transfers require privacy from other network validators. By non-limiting example, the CPT framework may be implemented to preserve confidentiality during a Proof-of-Stake (POS) election process. By non-limiting example, the protocol may be employed to enable confidential operations within arbitrary smart contracts on custom blockchains or VMs (e.g., Ethereum Virtual Machine (eEVM)) to provide a fully confidential VM.

As used herein, the term "blockchain" generally refers to an open and distributed public ledger comprising a growing list of records, which are linked using cryptography. By design, the blockchain is resistant to modification of the data. The blockchain can include an auditable database that provides a distributed, replicated ledger of cryptographically certified artifacts whose contents are extremely difficult to tamper with without detection, and therefore, are with very high probability, true copies of the intended content, and whose content are open for inspection via a suitable query interface.

As used herein, the term "block" generally refers to a record that is kept in a blockchain. For example, each block contains a cryptographic hash of the previous block, a timestamp, and transaction data, which can generally be represented as a Merkle tree root hash.

In some embodiments, the term "subnet" or "subnetwork" generally refers to a dynamic set of validators working together to achieve consensus on a state of a set of blockchains. For example, each blockchain is validated by exactly one subnet. A subnet can validate arbitrarily many blockchains. A validator node may be a member of arbitrarily many subnets. A subnet may manage its own membership and it may require that its constituent validators have certain properties. Herein, the term "subnet" may generally refer to one or more subnets and/or subnetworks.

In some embodiments, a customized blockchain may include a VM marketplace having subnets serviced by unique VM modules that allow users to create feature sets directed to specific needs. For example, a gaming application in the VM marketplace will have different VM modules than a finance application.

Example System Architecture

Figure 1:
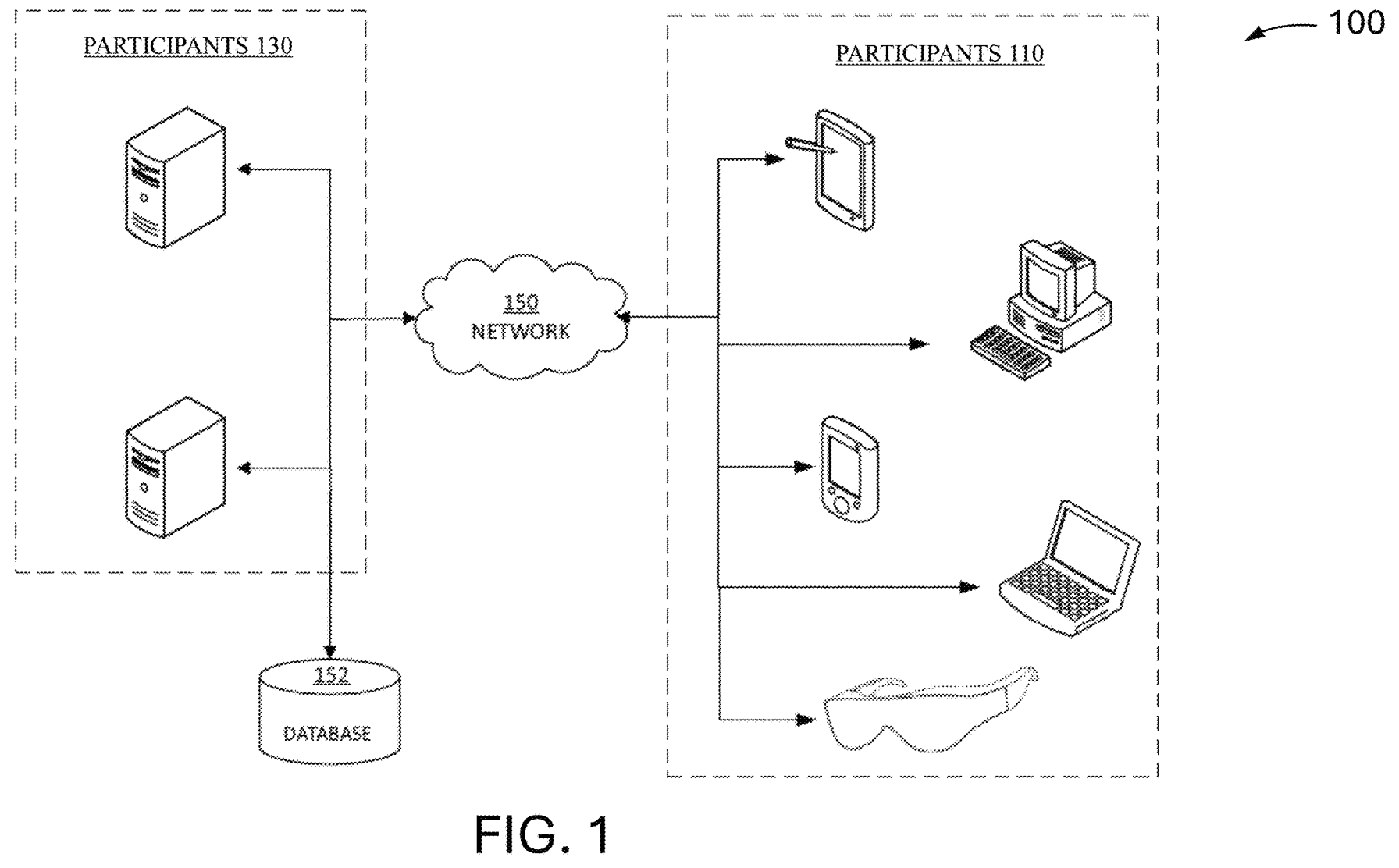

FIG. 1 illustrates a network architecture 100 used to implement a blockchain framework for practical and compliant on-chain privacy. Specifically, in this example, the network architecture 100 provides a blockchain implementation of CPT, a configurable confidential transfer system, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like).

The network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, or other device with sufficient computational, storage, and communication resources to execute software implementing various aspects of embodiments and that can be stored in a memory of the device. The participants 110 may be clients of the blockchain framework for creating, expanding, or otherwise modifying customized blockchain networks and/or private or public subnets. The participants 110 may comprise a plurality of nodes for a blockchain network. A node for a blockchain network may comprise an application or other software that records and/or monitors peer connections to other nodes and/or miners for the blockchain network. The nodes may continually record the state of the blockchain and respond to remote procedure requests for information about the blockchain. Aspects of the CPT protocol may be implemented at the node level, as part of a blockchain client software.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains, and accordingly run software to verify block and transaction data, store data, validate, respond to network requests for data, execute smart contracts, and/or the like for their respective blockchain(s). The VMs may be computers that run on blockchains and allow smart contracts from multiple sources to interact with one another.

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus and messaging protocols.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

FIG. 2 is a block diagram illustrating details of devices used in the architecture of FIG. 1, according to some embodiments. Specifically, the example of FIG. 2 illustrates an exemplary participant 110-1 (of the participants 110) and an exemplary participant 130-1 (of the participants 130) of the network architecture 100 of FIG. 1. The system 200 may implement protocols for blockchain-related consensus or messaging for any subnet or blockchain executing on the network architecture 100.

The participant 110-1 and the participant 130-1 access each other and other devices in the network 150 via corresponding communications modules 202-1 and 202-2, respectively. For example, participant 110-1 and the participant 130-1 may be connected by wired or wireless means to the Internet and support communication with a blockchain distributed ledger with smart contract support, such as Ethereum, via communications modules 202-1 and 202-2. Other embodiments may use different blockchains or non-blockchain based embodiments which may also have utility in some circumstances.

The communications modules 202-1 and 202-2 may be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 205-1, 205-2 and memory 220-1, 220-2, respectively. Communications modules 202-1 and 202-2, processors 205-1 and 205-2, and memories 220-1 and 220-2 will be collectively referred to, hereinafter, as "communications modules 202," "processors 205," and "memories 220." Processors 205 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by application 222 executing within memory 220-1 and couple with input devices 230 and output devices 232. The application 222 may be downloaded by a user from participant 130-1, and/or may be hosted by participant 130-1. The application 222 includes specific instructions which, when executed by processor 205-1, perform operations consistent with embodiments of the present disclosure.

In some embodiments, the application 222 runs on an operating system (OS) installed on participant 110-1. In some embodiments, application 222 may run within a web browser, wallet, finance application, or the like. In some embodiments, the processor 205-1 is configured to control a graphical user interface (GUI) (spanning at least a portion of input devices 230 and output devices 232) for the user of participant 110-1 to access participant 130-1. According to some embodiments, application 222 may include encryption and decryption schemes that can be downloaded and installed in participant 110-1. Various aspects of the encryption and decryption schemes may be implemented in software executed by the user devices. By non-limiting example, the software may make use of existing smart wallet functionality available on participant 110-1. Other functionality may be implemented remotely, such as, for example, in the context of smart contracts executed by devices supporting the blockchain transaction ledger.

Data and files associated with the application 222 may be stored in a local data file 224 stored in memory 220-1, a local database of participant 110-1 or participant 130-1, or an external database (e.g., database 152, a distributed database, and the like). The participant 110-1 may be used by a user of the blockchain framework to perform blockchain functions including, but not limited to, message transfer, exchange transactions, blockchain validation, smart contract registration, block proposal, and the like.

Participant 130-1 includes an API layer 240, which may control the application 222 in participant 110-1. API layer 240 may also provide instructions, procedural information, updates, or the like to participant 110-1 as, e.g., new features are uploaded in the application 222.

In some embodiments, memory 220-2 includes a blockchain engine 250. The blockchain engine 250 may be configured to perform methods and operations consistent with embodiments of the present disclosure. The blockchain engine 250 may share or provide features and resources with a client device, including data, libraries, and/or applications retrieved with blockchain engine 250 (e.g., application 222). The user may access the blockchain engine 250 through the application 222. Application 222 may be installed in participant 110-1 by participant 130-1 and perform scripts and other routines provided by participant 130-1.

System Framework

Figure 3:
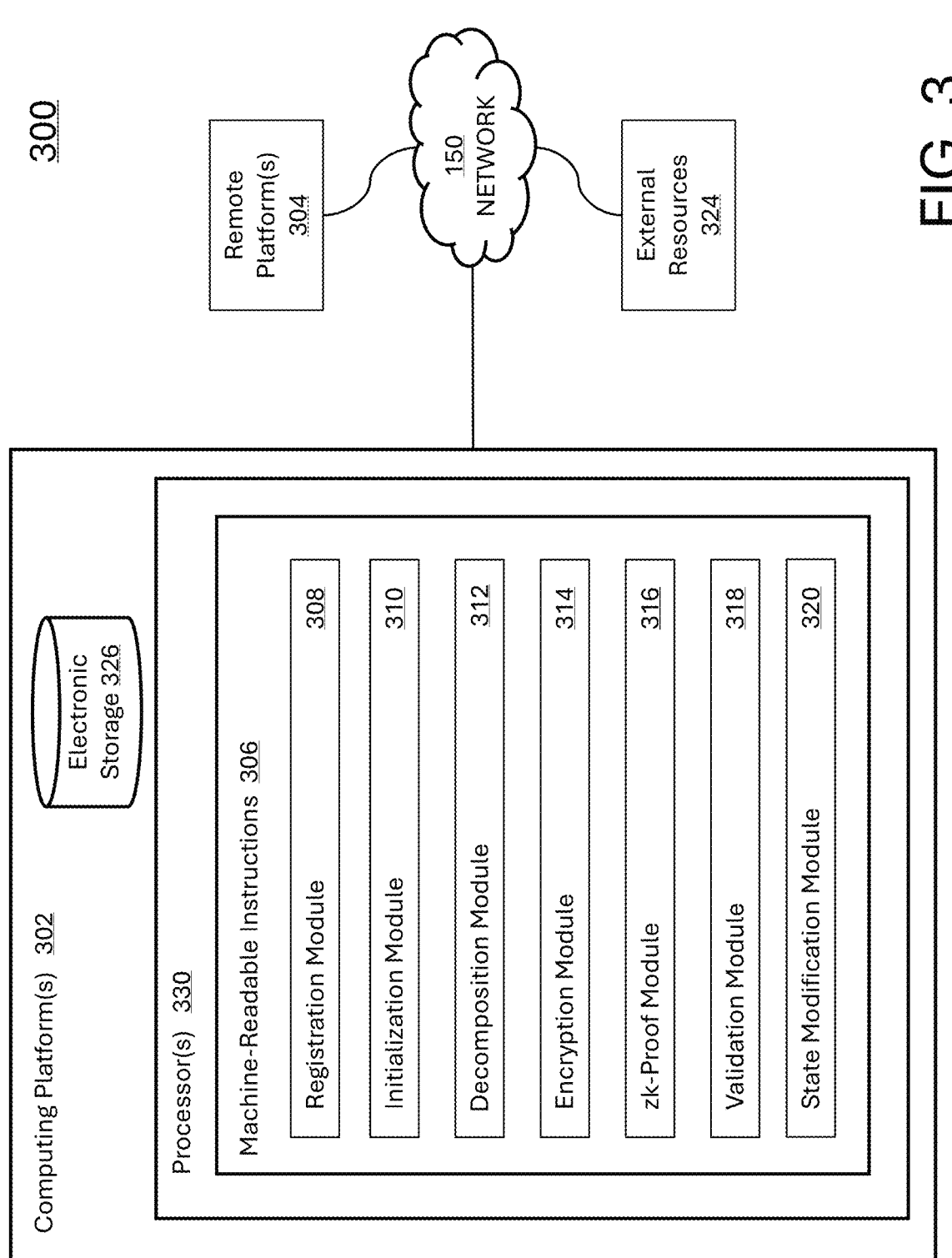
FIG. 3 is a block diagram illustrating a smart contract system implementing aspects of the subject technology, according to certain aspects of the present disclosure.

FIG. 3 is a block diagram illustrating a smart contract system 300 implementing aspects of the subject technology, according to one or more embodiments. The smart contract system 300 may be implemented within a blockchain network running CPT smart contracts. According to embodiments, a CPT smart contract may be deployed on a blockchain or in a blockchain network that includes one or more blockchains or subnets. Users can interact with CPT smart contracts through web browsers by connecting their digital wallets to decentralized applications (dApps). These dApps may provide a user interface that allows users to deploy and interact with CPT smart contracts. According to embodiments, CPT smart contracts may enable the conversion of ERC-20 tokens and native gas tokens to their respective encrypted versions.

In some implementations, the smart contract system 300 may include one or more computing platforms 302 executing various aspects of the system. The computing platform (s) 302 can correspond to a server component of the blockchain platform, which can be similar to or the same as the computing device(s) of participants 130 of FIG. 1 and include the client computing device(s) of participants 110 of FIG. 1 and include the processors 205 in FIG. 2.

Computing platform(s) 302 may represent blockchain platforms, nodes, validators, minor computers, or the like. The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. The remote platform(s) 304 can be configured to cause output of the system 300 on client device(s) of the remote platform(s) 304 with enabled access (e.g., based on analysis by the computing platform(s) 302) according to stored data. Any external blockchain platform built based on a platform/metadata chain of the computing platform(s) 302 that relies on the primary blockchain may also realize the benefits of CPT protocols. In this way, the platform chain, primary network, and other entities of the blockchain platform may communicate with the computing platform(s) 302. The computing platform(s) 302, external resources 324, and remote platform(s) 304 may be in communication and/or mutually accessible via the network 150.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of a registration module 308, initialization module 310, decomposition module 312, encryption module 314, zk-Proof module 316, validation module 318, and state modification module 320.

The registration module 308 may register accounts to the CPT smart contract. To interact with the CPT smart contract (e.g., send, receive or fund a CPT account), an owner of the account must first register to the CPT smart contract. Assuming the CPT smart contract is deployed, users must register to the smart contract prior to sending any transactions, as it involves creating their private key. CPT accounts may be identified with addresses in a blockchain network (e.g., Ethereum addresses), similar to regular ERC-20 contracts, enabling compatibility with existing systems. The blockchain network addresses may be stored in the CPT smart contract's internal state, with a respective ECEG public key mapped to each address.

To create a CPT account, a user may select a private key (e.g., a very large number), which is mapped to a point on an elliptic curve. The private key may be multiplied by the point on the elliptical curve to generate an ECEG public key. The point on the elliptic curve may be referred to as the generator point. The zk-proof module 316 may generate a zk-proof (e.g., zk-SNARK proof) to ensure the correctness of the ECEG public key generation. The zk-proof serves as proof that the user knows the secret key that corresponds to a given public key without revealing the private key. ECEG public key (x) may be connected or linked to a blockchain network address of the user, completing the registration process. This is achieved by generating a zk-proof of ownership of the underlying private key.

After registration, the initialization module 310 initializes the CPT smart contract. According to some embodiments, the initialization module 310 generates an initial balance for an account by encrypting 0 amount with randomness 0. Anyone can deposit funds to the account by simply sending b amount of tokens to the CPT smart contract by providing the target address. After executing a deposit, CPT smart contracts may generate an ECEG encryption of b with randomness 0 (since b is part of the transaction) and adds it to the encrypted initial balance associated with the public key x. In some implementations, a user may initialize their account at registration. For example, the user may encrypt the initial balance at registration using their public key by depositing an initial amount of tokens or setting the initial balance to zero.

The decomposition module 312 may be configured to generate congruences of sensitive values in a transaction prior to encryption. In some embodiments, the sensitive values include user balances and transaction amounts. Each of the congruences may be encrypted individually. The congruences may be determined by computing the remainder of a main value when divided by a set of predetermined prime numbers in the setup phase. This division results in a series of congruences, the series including an amount of congruences equal to the number of the selected primes. Deconstructing a transaction in this way allows for encryption/decryption of smaller, more manageable sub-values. According to embodiments, each of the sub-values may be encrypted individually. Similarly, each of the encrypted sub-values may be decrypted individually. According to some embodiments, the original scalar value may be determined from the decrypted sub-values using CRT.

The encryption module 314 may employ an encryption scheme including, for example, setup, encryption, and decryption operations. According to some embodiments, the encryption module 314 may implement an Elliptic Curve ElGamal (ECEG) encryption scheme over an elliptical curve. The encryption module 314 may encrypt a transaction amount using participants' (i.e., sender and receiver) public keys. According to embodiments, CPT may utilize ECEG over the Baby-Jubjub elliptic curve. The Baby-Jubjub elliptic curve is an exemplary twisted Edwards curve optimized for high security and efficiency in zero-knowledge proofs, such as the zk-SNARKs. The Baby-Jubjub curve is defined over a prime field $F_p$ with non-zero elements. The Baby Jubjub curve is particularly suited for zk-SNARKs due to its efficient arithmetic operations, which help create smaller and more efficient proof sizes. Using the Baby Jubjub curve in ECEG enables SNARK-friendly homomorphic addition and subtraction, significantly reducing proof generation times.

The zk-Proof module 316 may generate a zk-proof to prove the correctness of the encryption. The zk-proof is included in the transaction According to embodiments, the zk-proof may be a zk-SNARK proof, a cryptographic proofing system that allows a prover to demonstrate the validity of a computation to a verifier without disclosing the input values. The prover can only convince the verifier of the truth of the statement if that statement itself is actually true. The verifier does not know any knowledge (zero knowledge) of the prover's statement or solution, other than the truth of the statement. According to embodiments, the zk-proofs may be zk-morphic proofs which refer to the proving method for utilization of algorithms within a zk-SNARK circuit. The zk-morphic proofs enable efficient proving of the decryption of the homomorphic ECEG ciphertext balance, the knowledge of the underlying total balance, and correct encryption of the encrypted amount with both sender's and receiver's public keys.

According to embodiments, zk-SNARK proofs are composed of a set of algorithms $\Pi_{snark}$=(Setup, Prove, VerProof). Initially, during the setup phase of the zk-proof, an entity deploying the CPT smart contract generates a verifier key and an evaluation key. The verifier key and the evaluation key are public keys that users can fetch and perform the zk-proof generation operation. The verifier key may be embedded within the CPT smart contract, while the evaluation key is distributed to users. The evaluation key may be integrated into the users' digital wallets or browsers. In the evaluation phase, users utilize the evaluation key to encrypt transaction values, ensuring the integrity and correctness of the data without exposing sensitive information. The zk-proof guarantees to the verifier (e.g., the CPT smart contract, another party responsible for validating the transaction, etc.) that the transaction amount does not exceed the user's balance and that the encryption key used is legitimate, all without revealing the user's balance or the transaction amount.

According to embodiments, users can convert encrypted tokens back to respective standard tokens by revealing the current balance b and providing a zk-proof that public key x's ciphertext (i.e., the ciphertext associated with x on the smart contract) indeed encrypts b amount of tokens. In order to transfer some b amount of encrypted tokens to a public key y, without revealing the current balance b itself, one can encrypt the current balance b under both public key x and public key y, resulting with ciphertexts Cx and Cy.

Table 1 below includes steps in a proof generation algorithm, according to one or more embodiments.

TABLE 1

| Proof Generation |
| --- |
| CPT.GenerateProof(C, sk, pkA, pkB, amount):<br>  1. Balance ← Decrypt(C, sk)<br>  2. ProveBalanceOwnership(C, sk, Balance)<br>  3. Balance ≥ amount<br>  4. Encrypt transfer amount<br>    ECx ← Encrypt(amount, pkA),<br>    ECy ← Encrypt(amount, pkB)<br>  5. Compute zkProof ← GenerateProof(sk, BalanceB, amount, C, ECx, ECy)<br>  6. Output zkProof |

According to embodiments, the zk-proof is provided to show that the two ciphertexts are well-formed, they encrypt the same positive value, and the remaining balance associated with public key x is larger than or equal to 0. The same zk-proof may also include an encrypted transaction summary or summary field for an auditor. The summary field is designed to facilitate transaction audits by, for example, protocol deployers.

According to some embodiments, the summary is the symmetric encrypted version of the transaction amount of the confidential transfer, secured using an auditor key. In some embodiments, zk-proofs employ Poseidon symmetric encryption in conjunction with Elliptic Curve Diffie-Hellman (ECDH) to encrypt the transaction summary using the auditor's public key. The resulting ciphertext is then emitted by the CPT smart contract. This ensures that transaction data is accessible only to the designated auditor. Further, the improved auditability not only enables rapid transaction verification but also preserves the decentralized ethos of the CPT protocol, as it does not hinge on the auditor's transaction-by-transaction approval. This ensures that the auditor need not be perpetually online, thereby conserving computational resources and time.

By non-limiting example, two parties, Alice and the auditor, agree upon a common elliptic curve and a base point $B \in F_{q^2}$ with prime order p. Alice, who wants to encrypt her transaction data, generates a shared secret key kS using the auditor's public key K through ECDH, resulting in kS←[r]K where r is the random nonce. Alice creates an initial state for the Poseidon permutation S using kS and the nonce N, which may be a timestamp or a unique transaction identifier. Alice then encrypts her message M by absorbing it into the Poseidon state and iterating the Poseidon function over it, modifying the state with each chunk of the message. The resulting ciphertext C is a sequence of elements in $F_q$, which Alice sends to the auditor along with the additional information A required for decryption, such as [r]B and N.

The auditor, upon receiving the ciphertext C, can decrypt it using their private key and the shared secret kS regenerated from additional information A. This process ensures that only the auditor, who possesses the correct private key corresponding to the public key used for encryption, can decrypt and audit the transaction data. This method is intended to prevent illicit activities within the CPT protocol by making the encrypted data verifiable for compliance while maintaining privacy from other parties. The Poseidon encryption scheme's compatibility with ECDH and zk-SNARKs allows for seamless integration into the CPT's privacy and security framework.

According to embodiments, the smart contract system 300 may be further configured to package the transaction data in a payload and publish the transaction to a blockchain. The payload may include encrypted transfer amounts, the zk-proof, and the auditor's summary. Upon receiving the transaction, the validation module 318 may be configured to check the validity of the transaction based on the transaction payload. According to some embodiments, after a transaction is encrypted (according to encryption module 314) and the zk-proof is generated for correctness (according to zk-proof module 316), the CPT smart contract (e.g., at validation module 318) proceeds to checking whether x is a valid encrypted balance, the transaction summary is encrypted using a correct auditor public key, and the zk-proof is valid. According to embodiments, the CPT smart contract may employ the pre-stored verifier key to validate the zk-proof included with the transaction.

Table 2 below includes steps in a proof verification algorithm, according to one or more embodiments.

TABLE 2

| Proof Verification |
| --- |
| CPT.VerifyProof(zkProof,SmartContract):<br>  1. isValid ← SmartContract.verifyProof(zkProof)<br>  2. Output is Valid |

If the proof is verified successfully, the CPT smart contract proceeds with executing the transaction. Table 3 below includes steps in a transaction execution, according to one or more embodiments.

TABLE 3

| Transaction Execution |
| --- |
| CPT.TransactionExecution(UserA, zkProof, Amount, CT, BalanceHash, BalanceIndex):<br>  1. assert CPT.VerifyProof(zkProof)<br>  2. assert BalanceHashList.indexOf(CT) == BalanceIndex<br>  3. PerformTransaction(Amount, CT, UserA) |

Based on the transaction being valid, the state modification module 320 may update encrypted balances of users participating in the transaction. In some embodiments, state modification module 320 may subtract the ciphertext cx from x's encrypted balance and add ciphertext cy to y's most recent encrypted balance homomorphically. If the proof fails verification, the CPT smart contract may revert the transaction, thereby preventing fraudulent activities and ensuring robust security.

According to embodiments, the zk-proofs are generated (at zk-Proof module 316) with respect to a certain state of the CPT smart contract. To prevent users from experiencing front-running issues where pending transactions disrupt the transaction pipeline, the CPT smart contract implements a dynamic balance agreement (DBA) wherein only the owner of an account can decrease its balance. The balance may be decreased either by conducting a withdraw (e.g., converting encrypted tokens to standard tokens) or a transfer to another user. Until the account owner performs a negative operation, even though the encrypted balance can change because of incoming transfers from other users, it can only increase (not decrease) due to the transactions from other users. That is, when a user generates a zk-proof having a proven balance according to a latest state, and before the transaction processes another one or more incoming transactions that change the proven balance, the CPT smart contract knows that a final balance will be greater than the proven balance. Therefore, the subtraction of an encrypted amount from the final balance will be greater than 0. The CPT smart contracts leverage this knowledge to protect users from experiencing front-running issues.

According to embodiments, the DBA in the CPT smart contract maintains a record of past user balances in a list, until the owner of the balance conducts an operation that causes a decrease in the balance (e.g., transferring to other users or withdrawing some of the balance). The CPT smart contract stores hashes of past user balances. Storing the hashes, rather than the values, reduces storage usage. According to DBA, if a user's funds increase due to a deposit or incoming transfer, the hash of the new balance is added to a temporary array (e.g., balance list). When the owner of the balance conducts any operation on his balance, because the balance can decrease anywhere down to 0, and the smart contract cannot know the result, the array is cleared and updated with the hash of the new balance after the deduction. This ensures that all balances are kept on record until a decrease happens.

By using this strategy, while user x is creating a proof using his balance $b_1$, if user x receives a transaction from user y that results with his new balance $b_2$, since $b_2 > b_1$ and the proof states that the encrypted amount a is smaller than $b_1$, then $b_2 > b_1 > a$. Thus, $b_2 > a$ must be true. Since the transaction from user y moved $b_1$ to the balance list, after checking if balance $b_1$ is included in the balance list (i.e., $b_1 \in ListBal$), the CPT smart contract can confidently conclude that user x has more funds than what user x is trying to send. If the balance $b_1$ is not included in the balance list, the balance $b_1$ is added to the balance list array. The CPT smart contract then deducts amount a from the latest balance $b_2$ to prevent loss of funds, yielding $b_3$. This resets ListBal and inserts the hash of the $b_3$ to list.

Table 4 below includes steps in a dynamic balance agreement algorithm, according to one or more embodiments.

TABLE 4

| Dynamic Balance Agreement |
| --- |
| CPT.DynamicBalanceUpdate(UserA, NewBalance): |
| 1. if sender is not UserA then |
| AddHash(NewBalance,UserA.BalanceHashList) |
| else |
| ClearList(UserA.BalanceHashList, NewBalance) |

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include externally designed blockchain elements and/or applications designed by third parties. In some implementations, some or all of the functionality attributed herein to the external resources 324 may be provided by resources included in system 300.

Computing platform(s) 302 may include the electronic storage 326, a processor such as the processors 330, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s) 302 may be implemented by a cloud of computing platforms operating together as the computing platform(s) 302.

Electronic storage 326 may include non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by the processors 330, information received from computing platform(s) 302, information received from the remote platform(s) 304, and/or other information that enables the computing platform(s) 302 to function as described herein.

Processor(s) 330 may be configured to provide information processing capabilities in computing platform(s) 302. As such, processor(s) 330 may include one or more of a digital processor, an analog processor, a digital circuit designed to process information, an analog circuit designed to process information, a state machine, and/or other mechanisms for electronically processing information. Although processor(s) 330 is shown in FIG. 3 as a single entity, this is for illustrative purposes only. In some implementations, processor(s) 330 may include a plurality of processing units. These processing units may be physically located within the same device, or processor(s) 330 may represent processing functionality of a plurality of devices operating in coordination. Processor(s) 330 may be configured to execute modules 308, 310, 312, 314, 316, 318, and/or 320, and/or other modules. Processor(s) 330 may be configured to execute modules 308, 310, 312, 314, 316, 318, and/or 320, and/or other modules by software; hardware; firmware; some combination of software, hardware, and/or firmware; and/or other mechanisms for configuring processing capabilities on processor(s) 330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, and/or 320 are illustrated in FIG. 3 as being implemented within a single processing unit, in implementations in which processor(s) 330 includes multiple processing units, one or more of modules 308, 310, 312, 314, 316, 318, and/or 320 may be implemented remotely from the other modules. The description of the functionality provided by the different modules 308, 310, 312, 314, 316, 318, and/or 320 described below is for illustrative purposes, and is not intended to be limiting, as any of modules 308, 310, 312, 314, 316, 318 and/or 320 may provide more or less functionality than is described. For example, one or more of modules 308, 310, 312, 314, 316, 318, and/or 320 may be eliminated, and some or all of its functionality may be provided by other ones of modules 308, 310, 312, 314, 316, 318, and/or 320. As another example, processor(s) 330 may be configured to execute one or more additional modules that may perform some or all of the functionality attributed below to one of modules 308, 310, 312, 314, 316, 318, and/or 320.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4A:
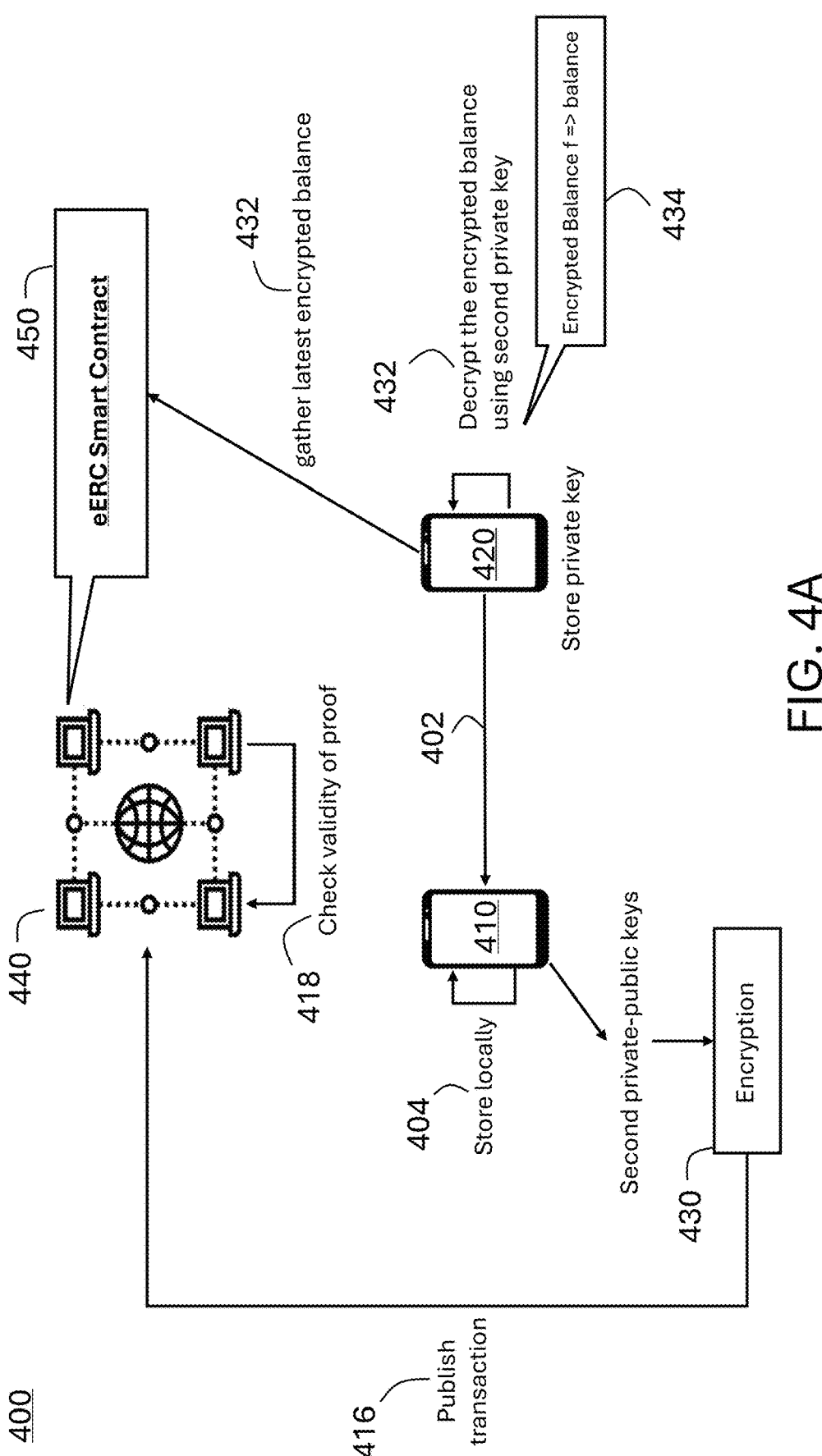
FIGS. 4A-4C illustrate aspects of a transaction flow, according to certain aspects of the present disclosure.
Figure 4B:
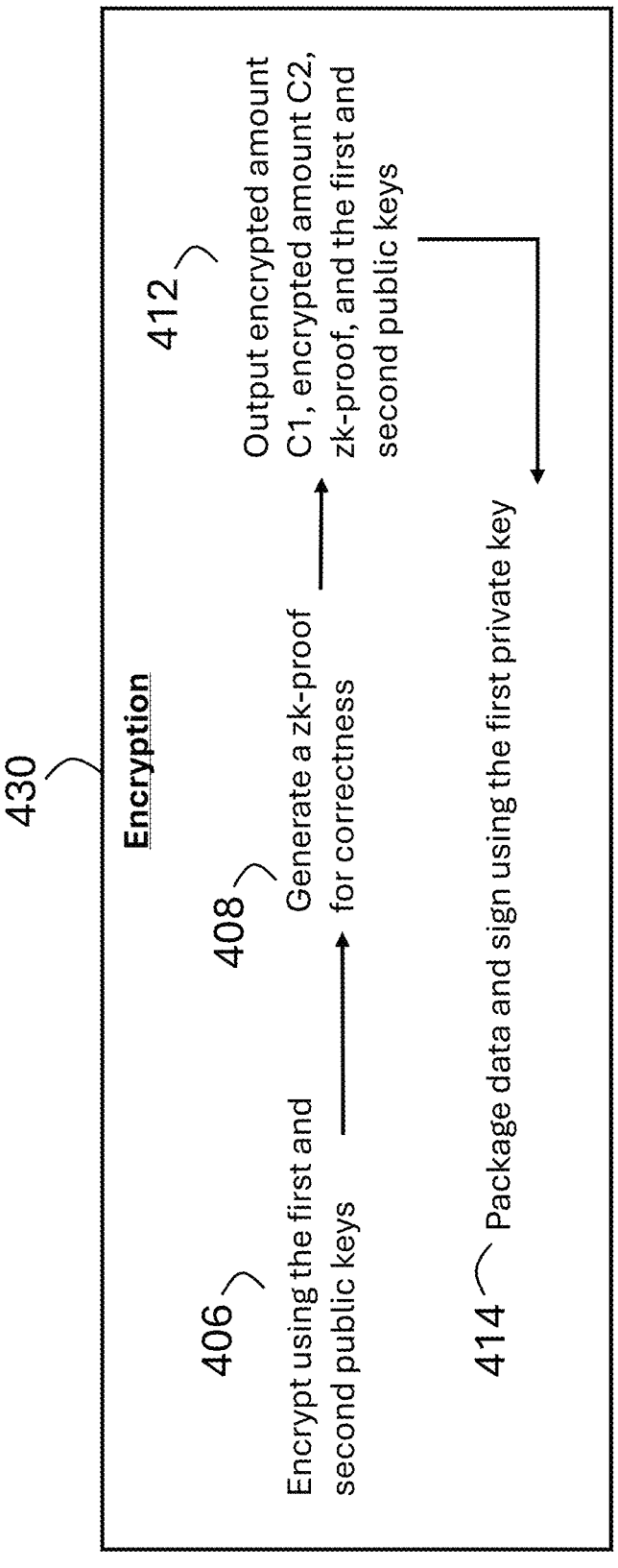
Figure 4C:
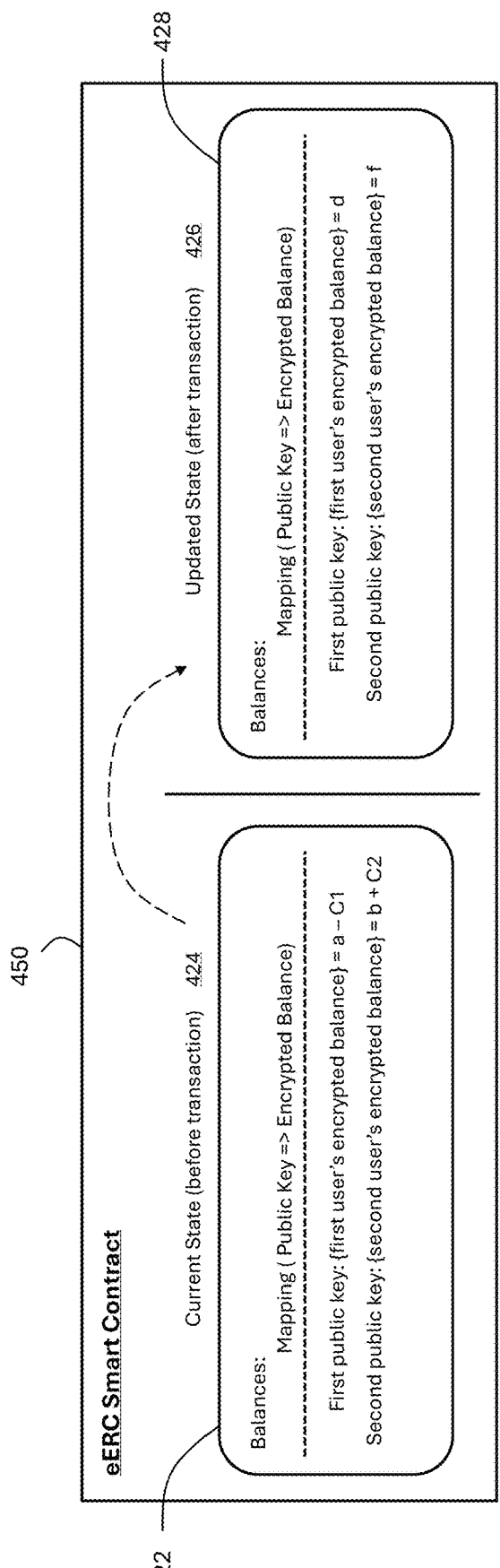

FIGS. 4A-4C illustrate aspects of a transaction flow 400, according to one or more embodiments. FIG. 4A illustrates an overview of the transaction flow 400 using CPT smart contracts. The transaction flow 400 illustrates an exemplary transaction between a first user device 410 and a second user device 420 within a blockchain network 440 running CPT smart contract 450. A first user of the first user device 410 and a second user of the second user device 420 may interact with the blockchain network 440 and CPT smart contract 450 through wallets, web browsers, or the like.

The first user may be associated with a private-public key pair. Similarly, the second user may be associated with a private-public key pair. The first user device 410 may store its private key (hereafter "first private key") in a secure enclave including, but not limited to, a Hardware Security Module (HSM) or the like. Similarly, the second user device 420 may store its private key (hereafter "second private key") in a secure enclave, including but not limited to an HSM. Each of the first and second user current account balances are encrypted using their respective private keys.

The second user device 420 provides its public key (hereafter "second public key") or blockchain address 402 to the first user device 410. The public key or blockchain address may be provided via an off-chain method including, but not limited to, short message service (SMS), social media, message, or the like. The first user device 410 may store the second public key locally 404 in, for example, the HSM of the second user device 420. A transaction may be initiated at the first user device 410 using, for example, the wallet, web browser, etc. The first private-public keys (corresponding to first user device 410) and the second public key may be used in the encryption 430 to encrypt the transaction.

FIG. 4B illustrates a workflow of the encryption 430, according to some embodiments. The encryption 430 may implement an ECEG encryption scheme according to CPT protocols. In some embodiments, the encryption 430 may include encrypting an amount to be transferred in the transaction 406. The amount is encrypted using the first public key and the second public key. In some embodiments, the encryption 430 may include generating a zk-proof for correctness 408 of the encrypted amount. The proof may be verified by a third-party without having any information about the contents of the transaction or decrypting and revealing underlying values (e.g., the amount or user balance). In some embodiments, the encryption 430 may include outputting the generated zk-proof, encrypted amount C1 and encrypted amount C2 for two values, and the first and second public keys 412. In some embodiments, the encryption 430 may include packaging the output data 414 (i.e., zk-proof, the encrypted amount C1 and encrypted amount C2, and the first and second public keys) into a transaction payload and signing the transaction payload using the first private key (i.e., private key of the sender). In some embodiments, the transaction including the transaction payload may be signed using the first private key.

As shown in FIG. 4A, the transaction and transaction payload may be published 416 to an entity of the blockchain network 440. In some implementations, the transaction (including the transaction payload) is published to one of a node, validator, or miner computer of the blockchain via a remote procedure call (RPC) protocol (e.g., JSON-RPC/TCP). The blockchain network 440, or entity of the blockchain network 440, may receive the transaction and check the validity of the zk-proof 418 in the transaction payload. The entity may deduct gas fees from the user of the first user device 410.

Based on the transaction payload being valid, the CPT smart contract 450 homomorphically modifies encrypted balances of the first and second users based on the transaction payload. According to embodiments, validators of the blockchain network 440 may update a state of the CPT smart contract 450 via consensus mechanisms.

FIG. 4C is an illustration of the CPT smart contract 450 adjustments and state updates, according to some embodiments. As shown in balances 422 in the contracts state before the transaction, the CPT smart contract 450 homomorphically subtracts encrypted amount C1 from an encrypted balance a of the first user and homomorphically adds the encrypted amount C2 to the second user's encrypted balance b. A current state 424 of the CPT smart contract 450 before the transaction is then updated from the current state 424 to an updated state 426 (i.e., a state of the CPT smart contract 450 after the transaction). According to the balances 428 in the contract's updated state 426, the first user's encrypted balance after the transaction is d and the second user's encrypted balance after the transaction is f.

As shown in FIG. 4A, the second user device 420 may gather the latest encrypted balance (i.e., encrypted balance f) 432 by connecting to the blockchain entity, for example, via RPC protocols or the like. The second device 420 may decrypt the encrypted balance f using the second private key 432 to obtain a new readable balance 434.

FIG. 5 is a block diagram illustrating an Elliptic Curve ElGamal (ECEG) encryption scheme 500 implemented in CPT protocols, according to some embodiments. The ECEG encryption scheme 500 provides efficient encryption and decryption, particularly in applications involving zero-knowledge proofs, as well as its additively homomorphic properties. Generally, Elliptic Curve Cryptography (ECC) offers enhanced security with relatively smaller key sizes. ECC utilizes the properties of elliptic curves over finite fields to provide a secure means of key generation, encryption, decryption, and homomorphism. The ECEG allows arithmetic operations on encrypted values without needing to decrypt them first. According to embodiments, ECEG encryption scheme 500 may encrypt values homomorphically within zk-proof circuits.

At setup, the ECEG encryption scheme 500 generates general parameters including an elliptic curve E, a generator point G, and a group order q. According to embodiments, the ECEG may be used for key generation. Private-public key pairs (sk, pk) are generated, where sk is a private key and pk is the corresponding public key. A message m 502 may be mapped to a point (e.g., generator point) on an elliptic curve (e.g., Baby Jubjub elliptical curve) mG to generate an EC representation M 504 (i.e., another point on the elliptical curve). The message m 502 may correspond to any plaintext message. The EC representation M 504 of the message m 502 may be encrypted by sampling a random value r and computing ciphertext components C 506. In ECEG, the encryption of message m produces the ciphertext C comprising $C1=[r]G$ and $C2=mG+[r]pk$.

According to embodiments, ECEG encryption scheme 500 may include decrypting the ciphertext C by computing $mG=C2-[sk]C1$ to determine the EC representation 508 and remapping the EC representation 508 to recover a decrypted original m 510.

Figure 6:
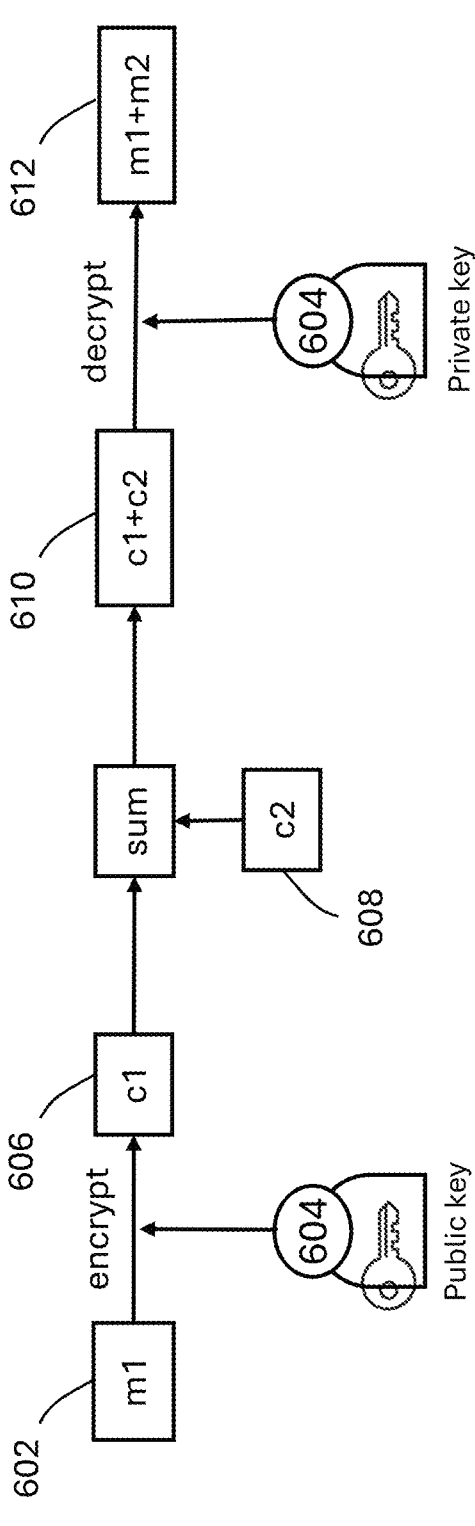
FIG. 6 is a block diagram illustrating homomorphic encryption property supported by ECEG, according to certain aspects of the present disclosure.

FIG. 6 is a block diagram illustrating homomorphic encryption property 600 supported by ECEG, according to some embodiments. A message (m1) 602 may be encrypted using a public key of user 604, resulting in ciphertext 606. Another user (not depicted) may encrypt a second message (m2) using the public key of user 604, resulting in ciphertext 608. Both ciphertext 606 and ciphertext 608 may be summed to generate an encrypted result 610 (i.e., c1+c2). The encrypted result 610 may be decrypted using a private key of the user 604 to arrive at the decrypted result 612 (i.e., m1+m2). As shown in FIG. 6, ECEG demonstrates additive homomorphism given the sum of two encrypted values results in another encrypted value. That is, $Enc(pk, m1)\oplus Enc(pk, m2)=Enc(pk, m1+m2)$. When decrypted, this value gives the sum of the original plaintext values. This property is demonstrated through the addition of ciphertexts and the corresponding decryption process.

In the ECEG encryption scheme 500, post decryption, instead of the actual scalar value, one retrieves a point on the elliptic curve (EC representation 508) corresponding to that scalar. In elliptic curve cryptography, recovering a scalar from a point-especially if the scalar exceeds $2^{32}$ is a security feature, rendering such computations infeasible. As such, users can only encrypt values up to a certain limit. Beyond this limit, decryption becomes impossible. ECEG encryption scheme 500 of the CPT protocol employs the Chinese Remainder Theorem (CRT) to help eliminate the encryption limit problem. CRT provides a systematic method for solving systems of simultaneous linear congruences with pairwise coprime moduli. CRT guarantees the existence and uniqueness of a solution to such systems. Specifically, for any given integers $(a_1, a_2, \ldots, a_k)$ and pairwise coprime positive integers $(n_1, n_2, \ldots, n_k)$, there exists a unique integer x such that $(0 \leq x \leq N)$ (where N is the product of the moduli) and $(0 \leq a_i \leq N)$ for each i. The CRT not only provides a method for finding an integer solution to a system of congruences, but also ensures the uniqueness of the solution modulo and the product of the moduli. The CRT is widely used in mathematical and computational applications, especially for efficiently handling large numbers.

Figure 7:
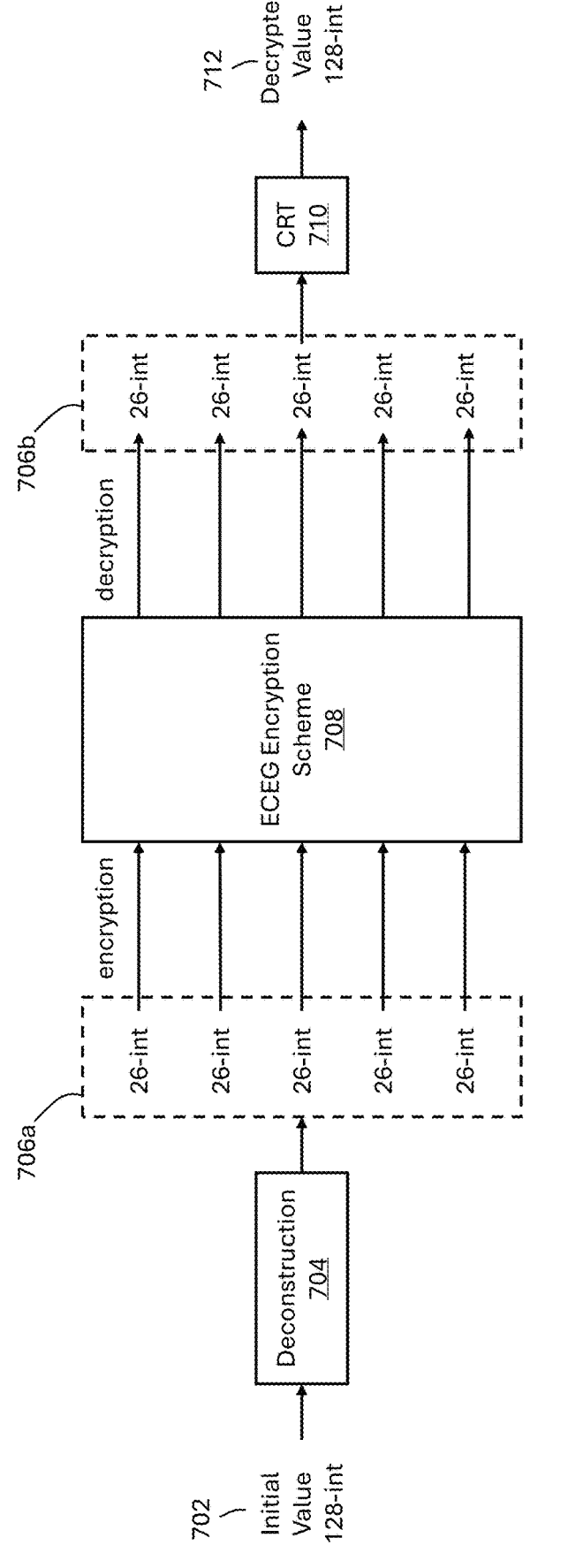
FIG. 7 is a block diagram illustrating ECEG encryption modified to implement a sub-value approach of the encrypted CPT protocol, according to certain aspects of the present disclosure.

FIG. 7 is a block diagram illustrating ECEG encryption 700 implementing a sub-value method of the CPT protocol, according to some embodiments. Modifying underlying elliptic curves or encryption algorithms to facilitate computations could introduce severe vulnerabilities, compromising the integrity of the entire cryptographic system. To circumvent this without undermining the fundamental security properties inherent in ECEG and elliptic curve cryptography, an embodiment of the CPT protocol requires that all encrypted values must be formed amenable to decryption and scalar recovery through the CPT methods disclosed herein. To remove this limitation, within the CPT framework, all sensitive values (e.g., user balances and transaction amounts) are first deconstructed into smaller sub-values.

According to embodiments, the deconstruction may be achieved by computing the remainder of a main value when divided by a set of predetermined prime numbers in the setup phase. In some embodiments, the set of predetermined prime numbers are each less than $2^{16}$. This division results in a series of congruences equal to the number of the selected primes. Instead of directly mapping the actual large value, the congruences are individually mapped to corresponding valid points on the elliptic curve, upon which ECEG encryption is performed for each point. The linear increase in the size of the ciphertext correlates directly with the number of primes utilized. According to embodiments, in the CPT smart contract, figures stored on the blockchain for user balances and transaction amounts may be encrypted not as direct values but as sets of congruences.

In the example shown in FIG. 7, five prime numbers, each smaller than $2^{11}$, are selected. The five prime numbers allow for the facilitation of homomorphic operations on values up to $2^{55}$, providing the CPT protocol with the ability to maintain computational efficiency and support for financial applications. Deconstruction 704 may be configured to deconstruct a main 128-bit integer (i.e., initial value 702) and transforms the large value into a series of 26-bit integer congruences 706*a* using CRT based on the five selected prime numbers. This will preserve the additively homomorphic properties of ECEG during encryption of each of the congruences 706*a*.

Each of the congruences 706*a* are then encrypted using an ECEG encryption scheme 708 (e.g., ECEG encryption scheme 500 and/or encryption 430). According to embodiments, each of the congruences 706*a* are encrypted using the sender's public key. Then, each of the congruences 706*a* are encrypted using the receiver's public key. Then, the initial value 702 is encrypted using an auditor's public key (the auditor previously agreed upon by participant(s)). Then, the transaction data including the sender's public key, receiver's public key, the auditor's public key, and the encrypted values are packaged and published to the CPT smart contract as the transaction. Upon receiving the transaction, the CPT smart contract may perform verification of the transactions. In some embodiments, the verification may include, but is not limited to, checking whether the auditor's public key is correct. In some embodiments, the verification may include, but is not limited to, checking whether a ciphertext proving a balance is included in a balance list. In some embodiments, the verification may include, but is not limited to, checking whether the sender's public key is correct (i.e., verifying ownership). If the verification yields true, the transaction is validated and may be executed through the CPT smart contract (e.g., homomorphically adjusting sender and receiver balances).

The encrypted values in the transaction may be decrypted using a decryption process of the ECEG encryption scheme 708 (e.g., described in embodiments of FIGS. 3-4), resulting in the congruences 706*b*. According to embodiments, each of the encrypted values may be decrypted individually. Upon application of the ECEG decryption algorithm, congruences 706*b* are transformed back into mapped elliptic curve points. Because the points represent the congruences rather than the larger scalar values themselves, subsequent recovery of scalars (i.e., sub-values) is significantly simplified. Following the recovery of the sub-values, CRT 710 is employed to accurately reassemble the original scalar values from the obtained sub-values and the corresponding primes to finish the decryption process and arrive at a final decrypted value 712. The strategic use of CRT within the CPT protocol is particularly advantageous due to its preservation of the additively homomorphic property inherent in modular arithmetic.

For example, to add two large integers $V_{m1}$ and $V_{m2}$, their remainders ($a_i$ and $b_i$, respectively) may be added in the corresponding congruences, as follows:

$$V_{m1} + V_{m2} = \sum_{i=1}^{r} (m1_i + m2_i) N_i y_i (\text{mod} N) \qquad \text{(Equation 1)}$$

This is possible due to modular arithmetic ($V_{m1}$+ $V_{m2}$=m1$_i$+m2$_i$ mod N$_i$). Given the underlying encryption scheme 700 is additively homomorphic, the homomorphic addition of the corresponding encrypted remainders will result in the encryption of their sum. This property is crucial for maintaining the integrity of encrypted computations, without the need to decrypt, for example, a transaction amount and/or the account balance. As a result, the advantage of CRT becomes apparent while performing decryptions. This approach significantly reduces decryption time for large values by solving for them using remainders (i.e., m1, m2). The larger the plaintext value, the higher the performance gain due to CRT (e.g., several orders of magnitude for large values). By non-limiting example, decryption of a 38-bit value can be reduced from 15 seconds to less than 10 ms for the CPT protocol using ECEG and CRT.

Using CRT, the maximum value representable as congruences is the product of the selected primes. This allows the CPT protocol to provide flexibility in parameter optimization for various applications and use cases by adjusting the number and size of the primes used. In some embodiments, choosing a greater number of smaller primes can result in faster decryption and smaller lookup table size. In some embodiments, a smaller set of larger primes may yield performance benefits, such as reduced zk-SNARK proof generation times and lower transaction gas costs, due to the decreased data footprint on the blockchain. The balance between cost and efficiency is a key consideration in the CPT protocol design, providing protocol administrators with the tools to tailor the system to their unique requirements. The choice of prime sizes and counts thus becomes a strategic decision, allowing for the optimization of transactional throughput, cost, and security within the blockchain environment.

According to embodiments, the CPT smart contracts may address the accumulation of noise using an optimized lookup table. It is known that the maximum value for the congruences (e.g., congruences 706*a*) can be mapped to a point on the elliptic curve that is smaller than the largest prime (e.g., $2^{11}$). However, in some instances, a regular lookup table may not be suitable for recovery of the scalar due to accumulation of noise. Utilization of the CRT enables the efficient reconstruction of a larger value from smaller sub-values. In the context of confidential transfers, all encrypted values, including balances and amounts in transactions, must be encrypted according to the rules enforced via CRT. As a result, the CPT smart contract performs homomorphic addition and subtraction operations on encrypted congruences instead of the actual values.

After the CPT smart contract performs multiple back-to-back transactions of continuous additions or subtractions to an encrypted balance, since the underlying congruences will increase or decrease continuously, the underlying congruences of the encrypted balance may deviate from the primes (which should have been the upper limits for fast point-to-scalar recovery). The accumulation of these discrepancies may be considered noise. Over time, this noise may reach a point where users can decrypt and obtain EC points, but cannot recover underlying scalars, and thus, cannot obtain correct balances.

According to embodiments, to address this noise problem, the CPT smart contract exploits the point addition and subtraction operations of elliptic curves, which eliminates the need for extensive lookup tables. In some implementations, primes for integers may be tuned up to $2^{55}$ to an optimized lookup table and may be generated according to this setting. The first step in generating an optimized lookup table includes creating a precomputed table with points, representing integers from −n to +n. In some embodiments, the precomputed table has values from −50,000 to +50,000, denoted as LimLow and LimUp. This lookup table is highly efficient, requiring only 8 MB of storage after point compression, so it can be stored easily in a browser or a storage of the mobile device. Next, the point representations of the LimLow and LimUp (−50,000 and +50,000) are saved from the table. After decrypting the balance and obtaining the noisy points, an iterative process is started to fix the noise.

The CPT smart contract may continuously add the point representation of LimLow and subtract LimUp, from each noisy point at the same time. By performing both operations, the CPT can account for the uncertainty regarding whether discrepancies in the underlying congruences of the balance are too positive or too negative.

At each addition and subtraction operation, the CPT checks if the resulting point is included in the precomputed table or not. At the same time, CPT keeps track of a count of performed operations. After x operations, the corresponding scalar of the point that lies in the table is stored and the iterative process is stopped. According to some embodiments, if x amount of the addition of LimLow found the scalar, it means that the congruences were shifted to the positive side, thus +50,000·x is added to the resulting scalar, which yields the actual large value. If the scalar is found by the subtraction of the LimUp, indicating that the congruences were shifted in the negative direction, −50,000·x is added to the resulting scalar. This step corrects the noise and retrieves the actual noisy point, without requiring generation of large lookup tables. Due to the properties of the modular arithmetic, CRT can reconstruct the actual value from these deviated sub-values.

Table 5 below includes steps in a noise reduction algorithm, according to one or more embodiments. Utilizing the CRT-based encryption scheme and noise reduction algorithm for efficient decryption of large values allows CPT to bring practical on-chain confidentiality.

TABLE 5

Noise Reduction

CPT.Setup(LowLimit, UpLimit):
    1. Compute table T ← Gen(LowLimit, UpLimit)
    2. Store Pmax = UpLimit, Pmin = LowLimit
CPT.Recover(Point, $P_{min}$, $P_{max}$):
    1. Check if the Point is in the table, if not, proceed.
    2. In each iteration i:
        a. Compute Point + i · $P_{max}$
        b. Compute Point + i · $P_{min}$
        c. Stop if result in the table and store i.
    3. Correct the noisy point by adding (i · ±UpLimit)

According to some embodiments, instead of performing full noise reduction every time the balance of the user changes, the user's wallet may be used to store the latest known congruences in a local storage. After the balance changes, it subtracts and adds previously saved noisy points to the newly retrieved noisy points, thus reducing the number of steps required for the noise reduction significantly. Even though the full noise reduction only needs to be performed in cases such as importing a private key to a wallet in a fresh device which has no knowledge about the previous congruences, this method of noise reduction is still highly efficient and practical. Even with the maximum amount of noise, it is possible to reconstruct the balance less than 2 seconds on a typical mobile device. This approach ensures that users can decrypt and obtain their correct balances quickly, addressing the noise problem efficiently and providing a good user experience.

Figure 8:
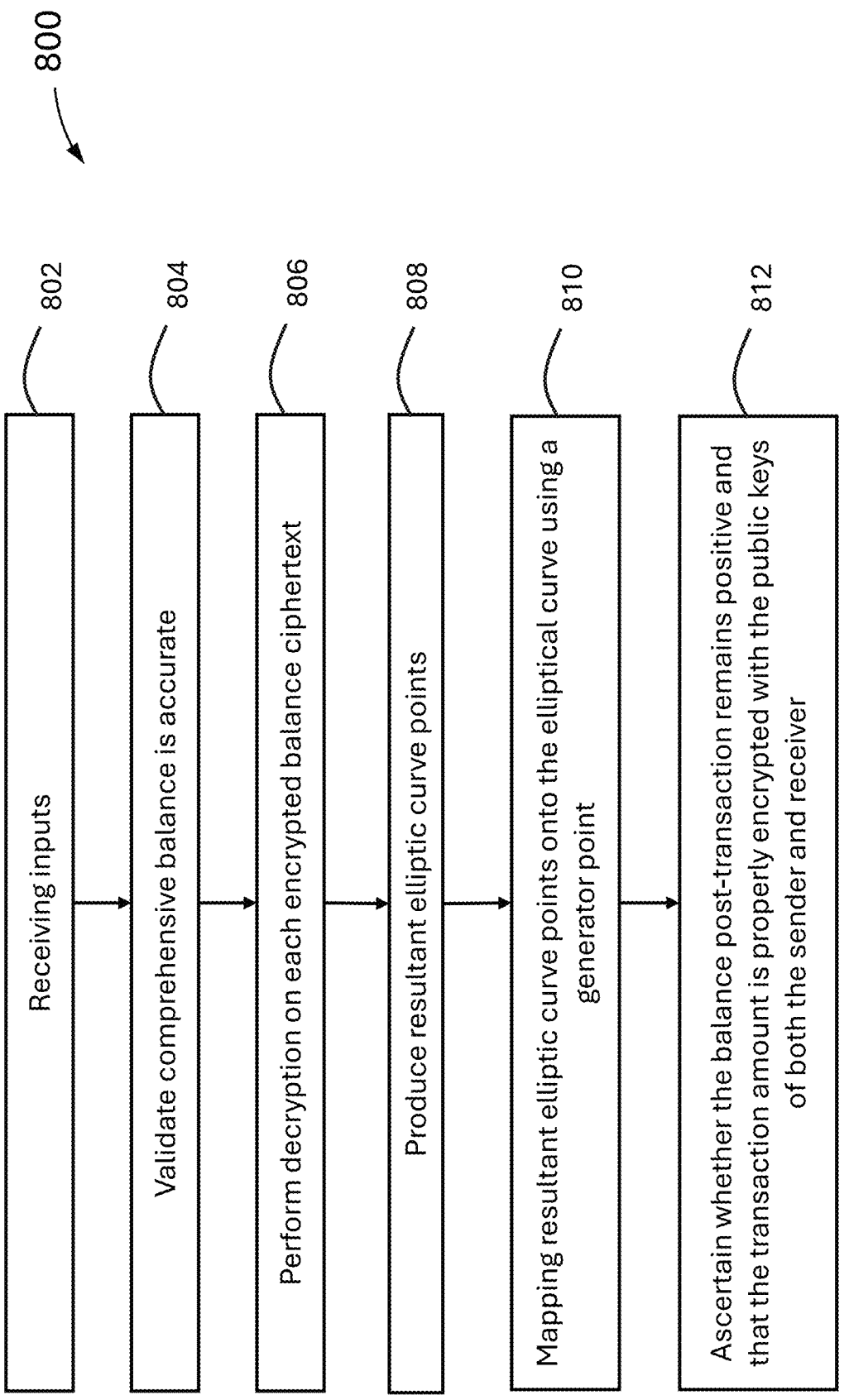
FIG. 8 illustrates exemplary operations in a process of a transfer protocol for using zk-morphic proofs within the encrypted CPT framework, according to certain aspects of the present disclosure.

FIG. 8 illustrates exemplary operations in a process 800 of a transfer protocol for using zk-morphic proofs within the CPT framework, according to one or more embodiments. According to embodiment, zk-morphic proof circuits correspond to the proof circuits designed to generate proofs in CPT transfers through the CPT smart contract as disclosed herein.

In order to spend encrypted tokens, a user must prove and show the underlying plaintext balance. While this can be easily computed off-chain via the CPT protocol, the usage of lookup tables and CRT algorithms within a zk-SNARK witness for performing the decryption of the balance is computationally expensive and not efficient. In the CPT protocol, the user client devices can only generate a proof (e.g., zk-morphic proof), and not large, centralized, or any kind of provers. Thus, an objective of the CPT protocol is to reduce proof generation time as much as possible, while not sacrificing other capabilities. The zk-morphic proofs enable efficient proving of the decryption of the modified (i.e., sub-value) homomorphic ECEG ciphertext balance, the knowledge of the underlying total balance, and correct encryption of the encrypted amount with both sender's and receiver's public keys.

To substantiate the integrity of decrypted values and verify possession of the correct underlying sub-values constituting the aggregate balance, the zk-morphic proof for the transfer protocol within the CPT framework may execute a sequence of cryptographic operations. The operations include receiving inputs 802 including the user's private ($usk^{send}$) and public ($upk^{send}$) keys, along with an array of encrypted ECEG balance ciphertexts ($Bal_{ENC}[5]$), given the employment of five distinct primes. Accompanying these are arrays of noisy congruences ($Bal_{EXCONG}[5]$), the comprehensive balance ($Bal_{FULL}$) and the sign indicators for the external congruences ($Sign_{EXCONG}[5]$).

Initially, the protocol posits that comprehensive balance ($Bal_{FULL}$) is the accurate aggregate balance. It then proceeds to validate this assumption that the comprehensive balance is accurate 804 against the CRT by deriving non-noisy remainders from the specified prime numbers. Table 6 below includes steps in deriving the non-noisy remainders following the example (detailed in FIG. 7) using five primes (e.g., 1511, 1523, 1531, 1543, and 1549).

TABLE 6

Derive Non-Noisy Remainders for i < 5 do:
    $Bal_{CONG}[i]$ ← $Bal_{FULL}$ % primes[i]
    return $Bal_{CONG}[5]$
end for Subsequent to establishing the non-noisy remainders, the protocol rectifies the noisy congruence BalEXCONG values to a consistently positive orientation, ensuring adherence to CRT prescriptions and congruence with the priorly calculated $Bal_{CONG}[5]$. Table 7 below includes a rectification algorithm, according to one or more embodiments.

TABLE 7

Rectification Algorithm for i < 5 do:
    temp[i] ← $Bal_{EXCONG}[i]$ % primes[i]
    if SignEXCONG[i] = 0
    temp[i]← primes[i] − temp[i]
    if SignEXCONG[i] = 1
    temp[i]← primes[i] + temp[i]
    PositiveExcong[i]← temp[i] % primes[i]
    assert PositiveExcong[i] % BalCONG[i] = 0
end for This ensures that the external congruences are the multiples of the fresh remainders since it checks whether their modulus yields 0. As a result, we can prove that notwithstanding discrepancies from anticipated fresh remainders, the external congruences are functionally equivalent.

The protocol may then assert that comprehensive balance $Bal_{FULL}$ is a result of correct construct of the external congruences via CRT. The protocol may then perform decryption (denoted as "HE.Dec" in Table 8) to each encrypted balance ciphertext with the user's secret key ($usk^{send}$) 806, producing a series of resultant elliptic curve points 808. The resultant elliptic curve points are then mapped from the external congruences onto the elliptic curve using the generator point 810. According to some embodiments, the resultant elliptic curve points may be mapped with an additional step to negate the generator point for negative congruences, as the circuit cannot process negative scalar values. These additional steps are outlined in Table 8 below.

TABLE 8

| Mapping Using Generator Point |
| --- |
| for i < 5 do: |
| $\quad$ Mi ← HE.Decusksend(BalENC[i]) |
| $\quad$ if SignEXCONG[i] = 0 // negative |
| $\quad$ mi← EC.negPK(BalEXCONG[i]) |
| $\quad$ assert Mi = mi |
| $\quad$ if SignEXCONG[i] = 1 // positive |
| $\quad$ mi← EC.PK(BalEXCONG[i]) |
| $\quad$ assert Mi = mi |
| end for |
| return true |

Conclusively, this protocol ensures a user can authoritatively demonstrate the accuracy of the balance decryption and confirm the authenticity of the encrypted values, adhering to the security premises of the CPT protocol.

Upon validation of the user's prior balance, the zk-morphic proof circuit then ascertains whether the balance post-transaction remains positive and that the transaction amount is properly encrypted with the public keys of both the sender and receiver 812. This operation (i.e., 812) involves the circuit receiving the transaction value, denoted as V, and the receiver's public key, $upk^{recv}$, along with the encrypted transaction amounts for each party, $$V_{enc}^{send},$$

$$V_{enc}^{recv}.$$

The process starts with checking if the amount is well-formed and smaller than the balance according to the following equation (2):

$$\text{assert } 0 < V \text{ \& } V \leq Bal_{FULL} \qquad \text{(Equation 2)}$$

Subsequently, the circuit validates the encrypted values $$V_{enc}^{send},$$

$$V_{enc}^{recv}$$

ensuring they are well-formed and represent the encryption of V's sub-values, denoted as $V_{cong}$. This also encompasses verifying adherence to the CRT methodology. It is important to note that since the sender lacks access to the receiver's private key, they cannot confirm the correctness of $$V_{enc}^{recv}$$

through decryption. Instead, the sender only decrypts $$V_{enc}^{send}$$

using $usk^{send}$ to demonstrate that the decrypted result matches $V_{cong}$. Concurrently, $V_{cong}$ is encrypted (denoted as "HE.Enc" in Table 9) using $upk^{recv}$ and the circuit ensures this encryption yields $$V_{enc}^{recv}.$$

To maintain clarity, this discussion omits the conventional additional inputs necessary for ECEG encryption, such as the random values used in the process. Table 9 below shows the operational flow of the encryption.

TABLE 9

| Operational Flow |
| --- |
| for i < 5 do: |
| $\quad V_{cong}[i]$ ← V % primes[i] |
| $\quad$ return $V_{cong}$ |
| end for |
| assert $V_{cong}$ ← HE.Dec$_{usk}^{send}$( $V_{enc}^{send}$ ) |
| assert $V_{enc}^{recv}$ ← HE.Enc$_{upk}^{recv}$($V_{cong}$) |

FIG. 9 illustrates an example flow diagram (e.g., process 900) for implementing secure transfers in a distributed ledger, according to certain aspects of the disclosure. For explanatory purposes, the steps of the example process 900 are described herein as occurring in serial, or linearly. However, multiple instances of the example process 900 may occur in parallel, overlapping in time, almost simultaneously, or in a different order from the order illustrated in the process 900. In addition, the blocks of the example process 900 need not be performed in the order shown and/or one or more of the blocks of the example process 900 need not be performed.

At step 902, the process 900 may include encrypting a transaction using a first public key corresponding to a first user and a second public key corresponding to a second user. According to some embodiments, the process 900 may include deconstructing sensitive values associated with the transaction. In some implementations, the sensitive values include the amount to be transferred in the transaction and user account balances. The values in the transaction may be deconstructed into a set of congruences based on a predetermined prime number. Each of the congruences in the set of congruences may be mapped to a point on an elliptical curve. The points on the elliptical curve may be encrypted, generating a first ciphertext based on the first public key and a second ciphertext based on the second public key. The encrypted amount may be based on an aggregation of the first ciphertext and the second ciphertext associated with the encrypted elliptical curve representations for each of the congruences in the set of congruences.

At step 904, the process 900 may include generating a zero-knowledge proof indicating that a current account balance corresponding to the first user is greater than an amount being transferred in the encrypted transaction. The zero-knowledge proof may be generated based on the account balances and the first public key.

At step 906, the process 900 may include generating a transaction summary for auditability of the transaction. The transaction summary may include an amount being transferred in the transaction. In some implementations, the transaction summary may also include other transaction data, a timestamp, or the like. The transaction summary may be encrypted, via symmetric encryption, using a shared secret key generated based on an auditor public key. The auditor key may be stored in the smart contract. According to embodiments, a ciphertext corresponding to the encrypted transaction summary is included in the transaction. An auditor private key corresponding to the auditor public key may be used to decrypt the encrypted transaction summary. According to embodiments, the process 900 may further include verifying if the encrypted transaction includes an encrypted transaction summary for an auditor, forcing users to encrypt transactions for intended a receiver as well as encrypting a summary of the transaction for an auditor. That is, encrypting the transaction and generating a ciphertext that can only be decrypted by the auditor, for example, at a later time.

At step 908, the process 900 may include transmitting the encrypted transaction to a blockchain, the encrypted transaction including an encrypted amount, the zero-knowledge proof, the transaction summary, and an encrypted balance of the first user. According to some embodiments, transmitting the encrypted transaction includes packaging the data associated with the transaction and publishing the encrypted transaction to a blockchain network.

At step 910, the process 900 may include verifying a correctness of the zero-knowledge proof. Verifying the correctness may include validating that the encrypted balance is greater than the encrypted amount and that the first public key is used to encrypt the transaction.

According to some embodiments, the process 900 may further include generating, in a smart contract on the blockchain, a balance list for storing hashes corresponding to previous encrypted balances. The balance list may be used to protect the smart contract from front-running issues. According to some embodiments, the process 900 may include determining whether a first hash corresponding to the encrypted balance in the transaction is included in the list. In some implementations, based on the first hash being included in the list, the list is reset (i.e., cleared) and a second hash, corresponding to a new encrypted balance corresponding to an aggregate of the encrypted balance and the encrypted amount, is added to the balance list. In some implementations, based on the first hash not being included in the list, the first hash is added to the balance list.

According to some embodiments, the process 900 may include determining whether the transaction increases or decreases the encrypted balance. In some implementations, based on the transaction decreasing the encrypted balance, the list is reset and a hash corresponding to a second encrypted balance corresponding to an aggregate of the encrypted balance and the encrypted amount is added to the list. In some implementations, based on the transaction increasing the encrypted balance, the hash is added to the balance list.

At step 912, the process 900 may include, based on the correctness, executing the transaction through a smart contract of the blockchain. According to embodiments, executing the transaction may include homomorphically updating encrypted balances of the first user and the second user in accordance with the encrypted amount. According to embodiments, executing the transaction may include homomorphically subtracting a first encrypted amount from the encrypted balance of the first user and homomorphically adding a second encrypted amount to an encrypted balance of the second user. In some embodiments, a state of the smart contract is updated via a consensus mechanism in accordance with the updated encrypted balances of the first user and the second user.

According to some embodiments, the process 900 may further include retrieving a latest encrypted balance stored on the smart contract based on the updated encrypted balances at step 908. The second user may decrypt an updated encrypted balance corresponding to the second user using the second private key.

The techniques described herein (for example, process 900) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIG. 9 may be performed by a processor circuit executing instructions stored in a memory circuit, in a client device, a remote server or a database, communicatively coupled through a network (e.g., processors 205, memories 220, participants 110, participants 130, database(s) 152, and network 150).

Although FIG. 9 shows example blocks of the process 900, in some implementations, the process 900 may include additional blocks, fewer blocks, different blocks, or differently arranged blocks than those depicted in FIG. 9.

Hardware Overview

Figure 10:
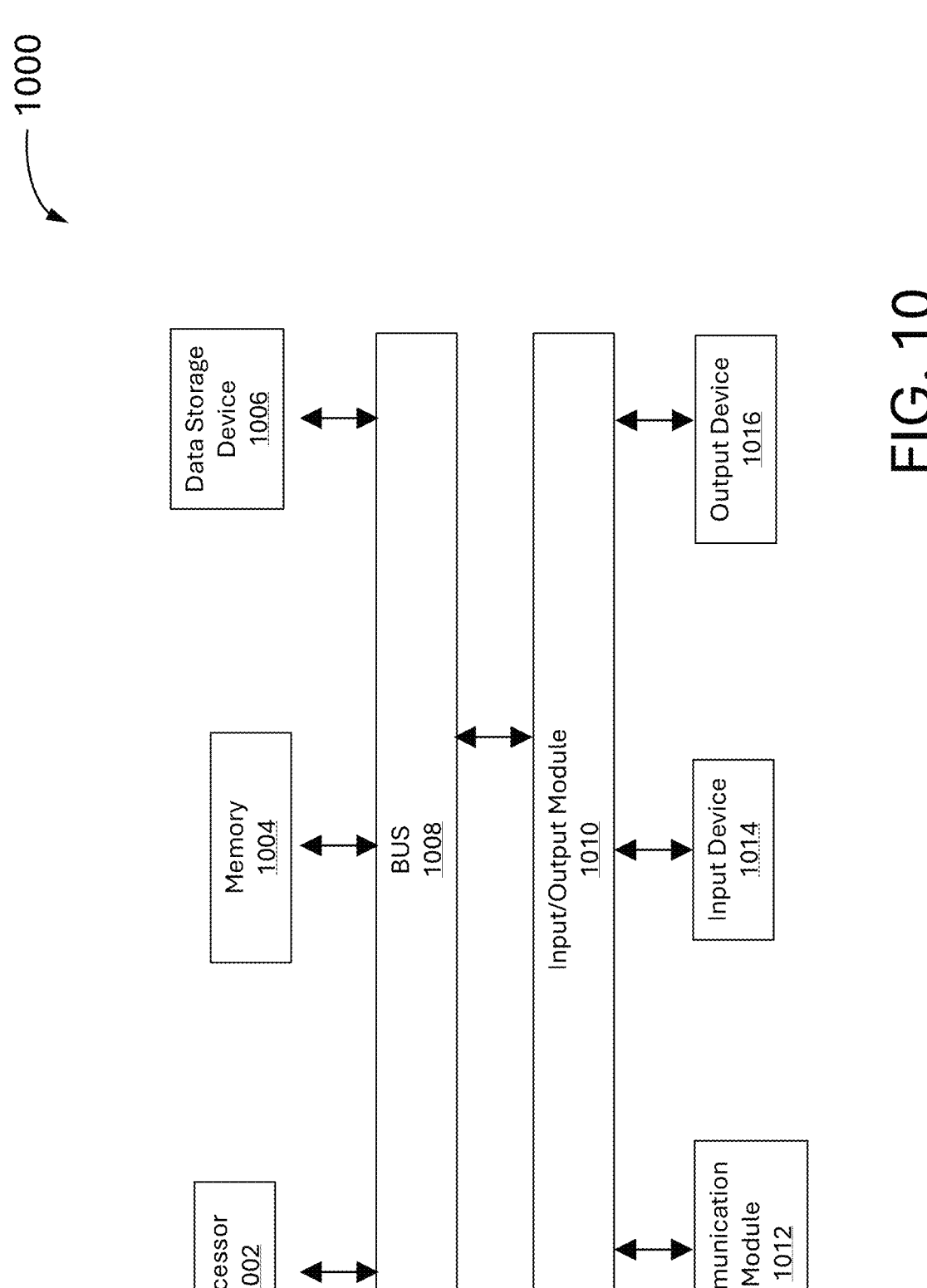
FIG. 10 is a block diagram illustrating an example computer system with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

The computer system 1000 (e.g., server and/or participant) includes a bus 1008 or other communication mechanism for communicating information, and a processor 1002 (e.g., processors 205) coupled with the bus 1008 for processing information. By way of example, the computer system 1000 may be implemented with one or more processors 1002. Each of the one or more processors 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. Processor 1002 and memory 1004 can be supplemented by, or incorporated in, special purpose logic circuitry.

The instructions may be stored in memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by the processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 1000 further includes a data storage device 1006 such as a magnetic disk or optical disk, coupled to bus 1008 for storing information and instructions. The computer system 1000 may be coupled via input/output module 1010 to various devices. The input/output module

1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described systems can be implemented using a computer system 1000 in response to the processor 1002 executing one or more sequences of one or more instructions contained in the memory 1004. Such instructions may be read into memory 1004 from another machine-readable medium, such as data storage device 1006. Execution of the sequences of instructions contained in the main memory 1004 causes the processor 1002 to perform the process steps described herein. One or more processors in a multi-processing arrangement may also be employed to execute the sequences of instructions contained in the memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1000 can include clients and servers. A client and server are generally remote from each other and typically interact through a communication network. The relationship of client and server arises by virtue of computer programs running on the respective computers and having a client-server relationship to each other. The computer system 1000 can be, for example, and without limitation, a desktop computer, laptop computer, or tablet computer. The computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 1006. Volatile media include dynamic memory, such as the memory 1004. Transmission media include coaxial cables, copper wire, and fiber optics, including the wires that comprise the bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize user privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the user's privacy settings or preferences. It should also be understood that the original applicant intends that the systems and methods described herein, if implemented or used by other entities, be in compliance with privacy policies and practices that are consistent with its objective to respect the user's privacy.

What is claimed is:

1. A computer-implemented method for implementing secure transfers, the method comprising:

encrypting a transaction using a first public key corresponding to a first user and a second public key corresponding to a second user;

transmitting the encrypted transaction to a blockchain, the encrypted transaction including at least an encrypted amount of the transaction, a zero-knowledge proof, and an encrypted account balance of the first user corresponding to an account balance when the zero-knowledge proof was generated;

verifying a correctness of the zero-knowledge proof, the verifying including at least in part:

determining whether a hash corresponding to the encrypted account balance is included in an account balance list maintaining a record of a user's previous account balances; and based on the correctness, executing the transaction through a smart contract of the blockchain and homomorphically updating encrypted balances of the first user and the second user in accordance with the encrypted amount and a latest balance on the account balance list of the first user after verifying the existence of the hash of the encrypted balance within the account balance list of the first user, wherein encrypting the transaction further comprises:

deconstructing, based on a predetermined prime number, an amount to be transferred in the transaction into a set of congruences;

mapping congruences in the set of congruences to a point on an elliptical curve to generate elliptical curve representations;

encrypting the elliptical curve representations to generate a first ciphertext based on the first public key and a second ciphertext based on the second public key; and generating the encrypted amount based on an aggregation of the first ciphertext and the second ciphertext associated with the encrypted elliptical curve representations for each of the congruences in the set of congruences.

2. The computer-implemented method of claim 1, further comprising:

generating the zero-knowledge proof indicating that a current account balance corresponding to the first user is greater than an amount being transferred in the encrypted transaction.

3. The computer-implemented method of claim 1, wherein verifying the correctness of the zero-knowledge proof further comprises: verifying that (i) the encrypted balance is greater than the encrypted amount and (ii) the first public key is used to encrypt the transaction.

4. The computer-implemented method of claim 1, further comprising:

registering an account with a smart contract on the blockchain, the registering including:

generating a public key by mapping the private key to an elliptical curve;

verifying ownership of the private key using a second zero-knowledge proof;

based on results of the verifying indicating correct ownership, storing the public key in state of the smart contract; and linking the account with an address on the blockchain; and generating an initial encrypted balance for the account.

5. The computer-implemented method of claim 1, further comprising:

generating a transaction summary; and encrypting, via symmetric encryption, the transaction summary using a shared secret key generated based on an auditor public key, wherein the encrypted transaction summary is included in the transaction, and an auditor private key corresponding to the auditor public key can decrypt the encrypted transaction summary.

6. The computer-implemented method of claim 1, further comprising: generating, in a smart contract on the blockchain, the account balance list for storing hashes corresponding to previous encrypted account balances.

7. The computer-implemented method of claim 6, further comprising:

determining whether a first hash corresponding to the encrypted balance is included in the list;

based on the first hash being included in the list, resetting the list and adding a second hash corresponding to a second encrypted balance, the second encrypted balance corresponding to an aggregate of the encrypted balance and the encrypted amount; and based on the first hash not being included in the list, adding the first hash to the list.

8. The computer-implemented method of claim 6, further comprising:

determining whether the transaction increases or decreases the encrypted balance;

based on the transaction decreasing the encrypted balance, resetting the list and adding a hash corresponding to a second encrypted balance to the list, the second encrypted balance corresponding to an aggregate of the encrypted balance and the encrypted a mount; and based on the transaction increasing the encrypted balance, adding the hash to the list.

9. The computer-implemented method of claim 1, wherein executing the transaction further comprises:

homomorphically subtracting a first encrypted amount from the latest balance in the account balance list encrypted balance of the first user, wherein the account balance list is then cleared and a new hash of a new latest balance is added to the account balance list;

homomorphically adding a second encrypted amount to a latest balance in an account balance list an encrypted balance of the second user, wherein a hash of a most recent balance of the second user is added to the account balance list of the second user; and updating a state of the smart contract via a consensus mechanism in accordance with updated encrypted balances the new latest balance of the first user and the most recent balance of the second user.

10. The computer-implemented method of claim 1, wherein the second user decrypts an updated encrypted balance corresponding to the second user using the second private key.

11. The computer-implemented method of claim 1, wherein the second user retrieves a latest encrypted balance stored on the smart contract based on the updated encrypted balances.

12. A system for implementing secure transfers, comprising:

one or more processors; and a memory comprising instructions stored thereon, which when executed by the one or more processors, causes the one or more processors to:

encrypt a transaction using a first public key corresponding to a first user and a second public key corresponding to a second user;

transmit the encrypted transaction to a blockchain, the encrypted transaction including at least an encrypted amount of the transaction, a zero-knowledge proof, and an encrypted account balance of the first user corresponding to an account balance when the zero-knowledge proof was generated;

verify a correctness of the zero-knowledge proof, the verifying including at least in part:

determining whether a hash corresponding to the encrypted account balance is included in an account balance list maintaining a record of a user's previous account balances; and based on the correctness, execute the transaction through a smart contract of the blockchain and homomorphically updating encrypted balances of the first user and the second user in accordance with the encrypted amount and a latest balance on the account balance list of the first user after verifying the existence of the hash of the encrypted balance within the account balance list of the first user, wherein the instructions, when executed by at least one of the one or more processors, further causes the system to:

deconstruct, based on a predetermined prime number, an amount to be transferred in the transaction into a set of congruences;

map congruences in the set of congruences to a point on an elliptical curve to generate elliptical curve representations;

encrypt the elliptical curve representations to generate a first ciphertext based on the first public key and a second ciphertext based on the second public key; and generate the encrypted amount based on an aggregation of the first ciphertext and the second ciphertext associated with the encrypted elliptical curve representations for each of the congruences in the set of congruences.

13. The system of claim 12, wherein the instructions, when executed by at least one of the one or more processors, further causes the system to:

generate the zero-knowledge proof indicating that a current account balance corresponding to the first user is greater than an amount being transferred in the encrypted transaction, wherein verifying the correctness of the zero-knowledge proof includes verifying that (i) the encrypted balance is greater than the encrypted amount and (ii) the first public key is used to encrypt the transaction.

14. The system of claim 12, wherein the instructions, when executed by at least one of the one or more processors, further causes the system to:

generate a transaction summary; and encrypt, via symmetric encryption, the transaction summary using a shared secret key generated based on an auditor public key, wherein the encrypted transaction summary is included in the transaction, and an auditor private key corresponding to the auditor public key can decrypt the encrypted transaction summary.

15. The system of claim 12, wherein the instructions, when executed by at least one of the one or more processors, further causes the system to:

generate, in a smart contract on the blockchain, the account balance list for storing hashes corresponding to previous account encrypted balances;

determine whether a first hash corresponding to the encrypted balance is included in the list;

based on the first hash being included in the list, reset the list and add a second hash corresponding to a second encrypted balance, the second encrypted balance corresponding to an aggregate of the encrypted balance and the encrypted amount; and based on the first hash not being included in the list, add the first hash to the list.

16. The system of claim 12, wherein the instructions, when executed by at least one of the one or more processors, further causes the system to:

homomorphically subtract a first encrypted amount from the latest balance in the account balance list encrypted balance of the first user, wherein the account balance list is then cleared and a new hash of a new latest balance is added to the account balance list;

homomorphically add a second encrypted amount to a latest balance in an account balance list an encrypted balance of the second user, wherein a hash of a most recent balance of the second user is added to the account balance list of the second user; and update a state of the smart contract via a consensus mechanism in accordance with updated encrypted balances the new latest balance of the first user and the most recent balance of the second user.

17. A non-transitory computer-readable medium storing a program for implementing secure transfers, which when executed by a computer, configures the computer to:

encrypt a transaction using a first public key corresponding to a first user and a second public key corresponding to a second user;

transmit the encrypted transaction to a blockchain, the encrypted transaction including at least an encrypted amount of the transaction, a zero-knowledge proof, and an encrypted account balance of the first user corresponding to an account balance when the zero-knowledge proof was generated;

verify a correctness of the zero-knowledge proof, the verifying including at least in part:

determining whether a hash corresponding to the encrypted account balance is included in an account balance list maintaining a record of a user's previous account balances; and based on the correctness, executing the transaction through a smart contract of the blockchain and homomorphically updating encrypted balances of the first user and the second user in accordance with the encrypted amount and a latest balance on the account balance list of the first user after verifying the existence of the hash of the encrypted balance within the account balance list of the first user, wherein the program, when executed by a computer, further configures the computer to:

deconstruct, based on a predetermined prime number, an amount to be transferred in the transaction into a set of congruences;

map congruences in the set of congruences to a point on an elliptical curve to generate elliptical curve representations;

encrypt the elliptical curve representations to generate a first ciphertext based on the first public key and a second ciphertext based on the second public key;

generate the encrypted amount based on an aggregation of the first ciphertext and the second ciphertext associated with the encrypted elliptical curve representations for each of the congruences in the set of congruences; and generate the zero-knowledge proof indicating that a current account balance corresponding to the first user is greater than an amount being transferred in the encrypted transaction.

*  *  *  *  *